(12) United States Patent
Gyoda et al.

(10) Patent No.: US 12,394,996 B2
(45) Date of Patent: Aug. 19, 2025

(54) BATTERY-POWERED SYSTEM, BATTERY PACK, ELECTRIC WORK MACHINE, AND CHARGER

(71) Applicant: MAKITA CORPORATION, Anjo (JP)

(72) Inventors: Minoru Gyoda, Anjo (JP); Hitoshi Suzuki, Anjo (JP); Motohiro Omura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/372,205

(22) Filed: Sep. 25, 2023

(65) Prior Publication Data

US 2024/0014671 A1    Jan. 11, 2024

Related U.S. Application Data

(63) Continuation of application No. 16/890,518, filed on Jun. 2, 2020, now Pat. No. 11,811,249.

(30) Foreign Application Priority Data

Jun. 4, 2019 (JP) .................................. 2019-104453

(51) Int. Cl.
  *H02J 7/00* (2006.01)
  *B25F 5/00* (2006.01)
  *H01M 50/574* (2021.01)

(52) U.S. Cl.
  CPC ............ *H02J 7/00306* (2020.01); *B25F 5/00* (2013.01); *H01M 50/574* (2021.01); *H02J 7/0063* (2013.01)

(58) Field of Classification Search
  None
  See application file for complete search history.

(56) References Cited

U.S. PATENT DOCUMENTS 5,371,453 A    12/1994  Fernandez
5,448,180 A     9/1995  Kienzler et al.
(Continued)

FOREIGN PATENT DOCUMENTS

CN    104779661 A    7/2015
EP      2897250 A1   7/2015
JP    2017140686 A   8/2017

OTHER PUBLICATIONS

Extended European Search Report from the European Patent Office dispatched Nov. 3, 2020 in related application No. EP 20177810.7, including Search Opinion and Search Report.
(Continued)

*Primary Examiner* — Arun C Williams
(74) *Attorney, Agent, or Firm* — J-TEK LAW PLLC; Jeffrey D. Tekanic; Scott T. Wakeman

(57) ABSTRACT

A battery-powered system includes a battery pack (10; 71; 81) connected to an electrical equipment (30; 50; 76; 86). The battery pack includes a first positive electrode terminal (11), a first negative electrode terminal (12), a first communication terminal (13), a first data input circuit (23), and a first limiting circuit (D11; D72; D82) that limits a flow of electric current in a direction from the first negative electrode terminal to the first communication terminal via the first data input circuit. The connected equipment includes a second positive electrode terminal (31; 51), a second negative electrode terminal (32; 52), a second communication terminal (33; 53), a second data input circuit (43; 63; 77; 87), and a second limiting circuit (D31; D51; D77; D87) that limits a flow of electric current in a direction from the second negative electrode terminal to the second communication terminal via the second data input circuit.

17 Claims, 7 Drawing Sheets

(56) References Cited

U.S. PATENT DOCUMENTS

| | | |
|---|---|---|
| 5,576,723 A | 11/1996 | Asprey |
| 5,955,869 A | 9/1999 | Rathmann |
| 5,990,659 A | 11/1999 | Frannhagen |
| 6,226,762 B1 | 5/2001 | Foote et al. |
| 7,443,137 B2 | 10/2008 | Scott et al. |
| 8,319,475 B2 | 11/2012 | Choksi et al. |
| 8,813,866 B2 | 8/2014 | Suzuki |
| 2005/0077878 A1 | 4/2005 | Carrier et al. |
| 2005/0093512 A1 | 5/2005 | Mader et al. |
| 2006/0087286 A1 | 4/2006 | Phillips et al. |
| 2006/0091858 A1 | 5/2006 | Johnson et al. |
| 2007/0226497 A1 | 9/2007 | Taylor |
| 2009/0039833 A1 | 2/2009 | Kitagawa |
| 2009/0085521 A1 | 4/2009 | Kim |
| 2010/0268492 A1 | 10/2010 | Matsuura |
| 2010/0325448 A1 | 12/2010 | Miki |
| 2011/0197389 A1 | 8/2011 | Ota et al. |
| 2011/0198103 A1 | 8/2011 | Suzuki |
| 2015/0200553 A1 | 7/2015 | Endo et al. |
| 2015/0331819 A1 | 11/2015 | Iwasaki et al. |
| 2016/0006190 A1 | 1/2016 | Katsuura et al. |
| 2016/0013673 A1 | 1/2016 | Workman et al. |
| 2017/0149096 A1* | 5/2017 | Shiraishi ............... H02J 7/0063 |
| 2017/0194670 A1 | 7/2017 | Kawano et al. |
| 2018/0277801 A1 | 9/2018 | Brozek et al. |

OTHER PUBLICATIONS

Office Action and Search Report from the Chinese Patent Office dispatched Aug. 7, 2024 in related CN application No. 202010404796. 2, and translation thereof.

Second Office Action from the Chinese Patent Office dispatched Dec. 3, 2024 in counterpart application No. 202010404796.2, and translation thereof.

* cited by examiner

BATTERY-POWERED SYSTEM, BATTERY PACK, ELECTRIC WORK MACHINE, AND CHARGER

CROSS-REFERENCE

This application is a continuation of U.S. patent application Ser. No. 16/890,518 filed on Jun. 2, 2020, now pending, which claims priority to Japanese patent application serial number 2019-104453, filed on Jun. 4, 2019, the contents of which are incorporated herein by reference in their entirety.

TECHNICAL FIELD

The present disclosure generally relates to circuit designs for executing data communication between a battery pack and an electrical equipment/device, such as an electric work machine (e.g., a power tool), a charger, etc., that is electrically connected to the battery pack.

BACKGROUND ART

Japanese Laid open Publication 2017-140686 discloses a power tool system configured to perform serial communication between a battery pack, which comprises a battery, and a power tool.

In this known power tool system, the battery pack comprises a negative electrode terminal, which is connected to a negative electrode of the battery, and a communication terminal. The power tool comprises a negative electrode terminal, which is connected to the negative electrode terminal of the battery pack, and a communication terminal, which is connected to the communication terminal of the battery pack. The serial communication between the battery pack and the power tool is performed via these communication terminals.

SUMMARY OF THE INVENTION

The power tool system disclosed in Japanese Laid open Publication 2017-140686 has a closed loop that includes the negative electrode terminal and the communication terminal of the battery pack and the negative electrode terminal and the communication terminal of the power tool. Therefore, it is possible for unintended (undesirable) noise currents to flow in this closed loop owing to, for example, noise generated in the power tool when the motor is driven or various other factors.

If a sufficiently high noise current (noise voltage) flows in this closed loop, then there is a possibility that a data receiving process will be erroneously executed (performed) in the power tool or the battery pack due to this noise current degrading the signal integrity of a signal transmitted from the battery pack to the power tool or vice versa. In this case, it is not possible to receive data accurately.

Therefore, it is one non-limiting object of the present disclosure to improve the accuracy of data communication between a battery pack and an electrical equipment connected thereto, even if noise is generated (present) in the communication circuit.

In one non-limiting aspect of the present disclosure, a battery-connected system (alternatively, "battery-powered system") may comprise a battery pack and a connected equipment (in particular, an electrical equipment/device, such as an electric work machine (e.g., a power tool), a charger, etc.). The connected equipment is adapted/configured to be selectively placed in a connected state, in which the connected equipment has been electrically connected to the battery pack, and in a state, in which the connected state has been released (terminated).

The battery pack may comprise at least a battery, a first positive electrode terminal, a first negative electrode terminal, a first communication terminal, a first data output circuit, a first data input circuit, and a first noise current limiting circuit or a first reverse current protection circuit (hereinafter, simply "first limiting circuit"). The battery comprises a positive electrode and a negative electrode. The first positive electrode terminal is electrically connected to the positive electrode of the battery. The first negative electrode terminal is electrically connected to the negative electrode of the battery. The first data output circuit may comprise at least a first output terminal, which is electrically connected to the first communication terminal, and is adapted/configured to output first transmit-data (one or more signals containing data regarding the battery, such as, e.g., current voltage, current temperature, etc.) from the first output terminal. The first data input circuit may comprise at least a first input terminal, which is electrically connected to the first communication terminal, and a first ground terminal, which is electrically connected to the first negative electrode terminal, and is adapted/configured such that second transmit-data (one or more signals containing data and/or instructions output by the connected equipment), which has been input (transmitted) from the connected equipment to the first communication terminal, is input to (at) the first input terminal. The first limiting circuit is adapted/configured to at least limit a flow of electric current (e.g., a noise current) in the direction from the first negative electrode terminal to the first communication terminal via the first data input circuit. That is, the first limiting circuit is preferably designed to at least limit the flow of electric current (e.g., noise) in the direction that is opposite (reverse) of the direction that the second-transmit data moves (flows) from the first communication terminal to the first input terminal. The first limiting circuit is preferably designed to not limit the flow of electric current (e.g., signals) in the direction that the second-transmit data moves (flows) from the first communication terminal to the first input terminal.

The electric work machine may comprise at least a second positive electrode terminal, a second negative electrode terminal, a second communication terminal, a second data output circuit, a second data input circuit, and a second noise current limiting circuit or a second reverse current protection circuit (hereinafter, simply "second limiting circuit"). The second positive electrode terminal is adapted/configured to be electrically connected to the first positive electrode of the battery pack in response to the connected equipment entering the connected state (e.g., when the battery pack is mounted on (physically and electrically connected to) the connected equipment). The second negative electrode terminal is adapted/configured to be electrically connected to the first negative electrode of the battery pack in response to the connected equipment entering the connected state. The second communication terminal is adapted/configured to be electrically connected to the first communication terminal of the battery pack in response to the connected equipment entering the connected state. The second data output circuit may comprise at least a second output terminal, which is electrically connected to the second communication terminal, and is adapted/configured to output second transmit-data (one or more signals containing data/instructions generated and output by the connected equipment) from the second output terminal. The second data input circuit may comprise at least a second input terminal, which is electrically connected to the second communication terminal, and a second ground terminal, which is electrically connected to the second negative electrode terminal, and is adapted/configured such that the first transmit-data, which has been input (transmitted) from the battery pack to the second communication terminal, is input to (at) the second input terminal. The second limiting circuit is adapted/configured to at least limit a flow of electric current in the direction from the second negative electrode terminal to the second communication terminal via the second data input circuit. That is, the second limiting circuit is preferably designed to at least limit the flow of electric current (e.g., noise) in the direction that is opposite (reverse) of the direction that the first-transmit data moves (flows) from the second communication terminal to the second input terminal. The second limiting circuit is preferably designed to not limit the flow of electric current (e.g., signals) in the direction that the first-transmit data moves (flows) from the second communication terminal to the second input terminal.

With such an embodiment of a battery-connected system (or battery-powered system; the same applied hereinbelow), because the battery pack comprises the first limiting circuit, the flow of electric current in the battery pack from the first data input circuit to the first communication terminal and, in turn, the input of that electric current to the connected equipment is limited, e.g., below a level that does not detrimentally affect the signal integrity of the second-transmit data. Furthermore, because the connected equipment comprises the second limiting circuit, the flow of electric current in the connected equipment from the second data input circuit to the second communication terminal and, in turn, the input of that electric current to the battery pack is limited, e.g., below a level that does not detrimentally affect the signal integrity of the first-transmit data. Consequently, such a design makes it possible to more accurately execute (perform) data communication between the battery pack and the connected equipment.

In addition, the battery pack may include a first signal path connecting the first input terminal and the first communication terminal. The first signal path may include a first connection point. By connecting the first output terminal to the first connection point, the first output terminal is electrically connected to the first communication terminal via the first connection point and the first signal path. The first limiting circuit may be provided on the first data input circuit side of the first connection point.

With such an embodiment of a battery-connected system, because the first limiting circuit is provided in the battery pack on the first data input circuit side of the first connection point (i.e. the first limiting circuit is not provided in the signal path connecting the first communication terminal to the first output terminal in the battery pack), the first limiting circuit does not degrade (negatively affect) the quality (signal integrity) of the first transmit-data transmitted from the first data output circuit to the connected equipment via the first communication terminal.

In addition or in the alternative, the connected equipment may include a second signal path connecting the second input terminal and the second communication terminal. The second signal path may include a second connection point. By connecting the second output terminal to the second connection point, the second output terminal is electrically connected to the second communication terminal via the second connection point and the second signal path. The second limiting circuit may be provided on the second data input circuit side of the second connection point.

With such an embodiment of a battery-connected system, because the second limiting circuit is provided in the connected equipment on the first data input circuit side of the second connection point (i.e. the second limiting circuit is not provided in the signal path connecting the second communication terminal to the second output terminal in the connected equipment), the second limiting circuit does not degrade (negatively affect) the quality (signal integrity) of the second transmit-data transmitted from the second data output circuit to the battery pack via the second communication terminal.

In addition or in the alternative, the first data input circuit of the battery pack may comprise at least a first switching device (e.g., a transistor), a first bias path, and a first resistor. The first switching device may comprise at least a first switch input terminal (e.g., a gate of the transistor), which is electrically connected to the first input terminal, and a first switch ground terminal (e.g., a source of the transistor), which is electrically connected to the first ground terminal. The first bias path may connect the first switch input terminal and the first switch ground terminal (e.g., a gate-source connection) and thus ultimately to the first ground terminal. The first resistor may be provided in the first bias path. Furthermore, the first limiting circuit may be provided in the first bias path.

With such an embodiment of a battery-connected system, because the first limiting circuit is provided in the first bias path in the battery pack (i.e. the first limiting circuit is not provided in the signal path connecting the first communication terminal to the first switch input terminal of the first data input circuit), the first limiting circuit does not degrade (negatively affect) the quality (signal integrity) of the second transmit-data output from the connected equipment and input to the first data input circuit of the battery pack via the first and second communication terminals and the first input terminal.

In addition or in the alternative, the second data input circuit of the connected equipment may comprise at least a second switching device (e.g., a transistor), a second bias path, and a second resistor. The second switching device may comprise at least a second switch input terminal (e.g., a gate of the transistor), which is electrically connected to the second input terminal, and a second switch ground terminal (e.g., a source of the transistor), which is electrically connected to the second ground terminal. The second bias path may connect the second switch input terminal and the second switch ground terminal (e.g., a gate-source connection) and thus ultimately to the second ground terminal. The second resistor may be provided in the second bias path. Furthermore, the second limiting circuit may be provided in the second bias path.

With such an embodiment of a battery-connected system, because the second limiting circuit is provided in the second bias path in the connected equipment (i.e. the second limiting circuit is not provided in the signal path connecting the second communication terminal to the second switch input terminal of the second data input circuit), the second limiting circuit does not degrade (negatively affect) the quality (signal integrity) of the first transmit-data output from the battery pack and input to the second data input circuit of the connected equipment via the first and second communication terminals and the second input terminal.

In addition or in the alternative, the first limiting circuit may comprise at least a first diode that limits the flow of electric current in the direction from the first negative electrode terminal to the first communication terminal via the first data input circuit.

With such an embodiment of a battery-connected system, it is possible to configure the first limiting circuit in a simple manner.

In addition or in the alternative, the second limiting circuit may comprise at least a second diode that limits the flow of the electric current in the direction from the second negative electrode terminal to the second communication terminal via the second data input circuit.

With such an embodiment of a battery-connected system, it is possible to configure the second limiting circuit in a simple manner.

In addition or in the alternative, the connected equipment may comprise a mounting part, which is adapted/configured such that the battery pack is mountable thereon and demountable (removable, detachable) therefrom. The connected equipment may be adapted/configured to be placed in the connected state in response to the battery pack being mounted on the mounting part.

With such an embodiment of a battery-connected system, it is possible to mechanically and electrically connect the battery pack and the connected equipment in a simple manner.

The battery-connected system may further comprise an intermediate device (e.g., a corded adapter). The intermediate device may comprise at least: a cable (cord); a first mounting part, which is adapted/configured such that the battery pack is mountable thereon and demountable therefrom; and a second mounting part, which is adapted/configured such that the connected equipment is mountable thereon and demountable therefrom.

The first mounting part may comprise at least a first positive electrode intermediate terminal, a first negative electrode intermediate terminal, and a first communication intermediate terminal. The first positive electrode intermediate terminal may be adapted/configured to be connected to the first positive electrode terminal in response to the battery pack being mounted on the first mounting part. The first negative electrode intermediate terminal may be adapted/configured to be connected to the first negative electrode terminal in response to the battery pack being mounted on the first mounting part. The first communication intermediate terminal may be adapted/configured to be connected to the first communication terminal in response to the battery pack being mounted on the first mounting part.

The second mounting part may comprise at least a second positive electrode intermediate terminal, a second negative electrode intermediate terminal, and a second communication intermediate terminal. The second positive electrode intermediate terminal may be adapted/configured to be connected to the second positive electrode terminal in response to the connected equipment being mounted on the second mounting part. The second negative electrode intermediate terminal may be adapted/configured to be connected to the second negative electrode terminal in response to the connected equipment being mounted on the second mounting part. The second communication intermediate terminal may be adapted/configured to be connected to the second communication terminal in response to the connected equipment being mounted on the second mounting part.

The cable may comprise (contain within it) at least a positive electrode intermediate wire, a negative electrode intermediate wire, and a communication intermediate wire. The positive electrode intermediate wire may electrically connect the first positive electrode intermediate terminal and the second positive electrode intermediate terminal. The negative electrode intermediate wire may electrically connect the first negative electrode intermediate terminal and the second negative electrode intermediate terminal. The communication intermediate wire may electrically connect the first communication intermediate terminal and the second communication intermediate terminal.

With such an embodiment of a battery-connected system, because the battery pack and the connected equipment are electrically connected via the intermediate device without being directly connected in a mechanical manner, the ergonomics of the battery-connected system can be improved owing to the fact that the battery pack (which may be heavy) may be placed, e.g., on a surface, such as the ground or a table, or clipped to an article of clothing, e.g., a belt, a shoulder harness, etc., while the user holds the connected equipment to perform work with the connected equipment (which does not have the weight of the battery pack attached thereto), thereby reducing the load (strain) on the user while performing work with the connected equipment.

In addition or in the alternative, the connected equipment may comprise or may be an electric work machine, such as, e.g., a power tool, outdoor power equipment, etc. The electric work machine may comprise a manipulatable switch (e.g., a trigger), a motor, a motor drive circuit (e.g., a PWM circuit), and a drive mechanism (e.g., a gear transmission). The manipulatable switch may be manipulated by a user of the electric work machine to control operation (driving) of the motor. The motor drive circuit may be adapted/configured to drive the motor, using electric power supplied from the battery pack, in response to the manipulatable switch being manipulated. The drive mechanism may be adapted/configured to detachably mount or attach a work output member (e.g., a tool accessory) thereon or such that the work output member (e.g., a tool accessory) is integrally (permanently) affixed to the drive mechanism. The drive mechanism may be adapted/configured to cause the work output member to act (e.g., rotate, linearly reciprocate or both) on a work target by transmitting a rotational drive force of the motor and driving (e.g., moving) the work output member using that rotational drive force.

With such an embodiment of a battery-connected system, data communication between the battery pack and the electric work machine may be accurately executed (performed) owing to the first and second limiting circuits.

In the alternative, the connected equipment may comprise a charger, which has been adapted/configured to charge the battery.

With such an embodiment of a battery-connected system, data communication between the battery pack and the charger may be executed more accurately (performed) owing to the first and second limiting circuits.

In another aspect of the present disclosure, a battery pack is adapted/configured to be selectively placed in a connected state, in which the battery pack has been electrically connected to a connected equipment (in particular, an electrical equipment, such as an electric work machine (e.g., a power tool), a charger, etc.), and in a state, in which the connected state has been released (terminated).

The battery pack may comprise at least a battery, a pack positive electrode terminal, a pack negative electrode terminal, a pack communication terminal, a data output circuit, a data input circuit, and a noise current limiting circuit or a reverse current protection circuit (hereinafter, simply "limiting circuit").

The battery comprises a positive electrode and a negative electrode. The pack positive electrode terminal is electrically connected to the positive electrode of the battery and is adapted/configured to be electrically connected to the connected equipment in response to the battery pack entering the connected state (e.g., when the battery pack is mounted on the connected equipment). The pack negative electrode is electrically connected to the negative electrode of the battery and is adapted/configured to be electrically connected to the connected equipment in response to the battery pack entering the connected state. The pack communication terminal may be adapted/configured to be electrically connected to the connected equipment in response to the battery pack entering the connected state. The data output circuit comprises an output terminal connected to the pack communication terminal and is adapted/configured to output first transmit-data from the output terminal. The data input circuit may comprise at least an input terminal, which is electrically connected to the pack communication terminal, and a ground terminal, which is electrically connected to the pack negative electrode terminal. The data input circuit is adapted/configured such that second transmit-data (one or more signals containing data and/or instructions output by the connected equipment), which has been input (transmitted) from the connected equipment to the pack communication terminal, is input to (at) the input terminal. The limiting circuit is adapted/configured to at least limit a flow of electric current (e.g., a noise current) in the direction from the pack negative electrode terminal to the pack communication terminal via the data input circuit. That is, the limiting circuit is preferably designed to at least limit the flow of electric current (e.g., noise) in the direction that is opposite (reverse) of the direction that the second-transmit data moves (flows) from the first communication terminal to the first input terminal. The limiting circuit is preferably designed to not limit the flow of electric current (e.g., signals) in the direction that the second-transmit data moves (flows) from the first communication terminal to the first input terminal.

With such an embodiment of a battery pack, because the limiting circuit is provided, the flow of electric current from the data input circuit to the pack communication terminal and, in turn, the input of that electric current to the connected equipment is limited, e.g., below a level that does not detrimentally affect the signal integrity of the second-transmit data. Consequently, such a design makes it possible to more accurately execute (perform data) communication between the battery pack and the connected equipment owing to the limiting circuit.

In yet another aspect of the present disclosure, an electric work machine is adapted/configured to be selectively placed in a connected state, in which the electric work machine has been electrically connected to a battery pack comprising a battery (in particular, when the battery pack is mounted on the electric work machine (e.g., a power tool, outdoor power equipment, etc.)), and in a state, in which the connected state has been released (terminated).

The electric work machine may comprise at least an equipment positive electrode terminal, an equipment negative electrode terminal, an equipment communication terminal, a data output circuit, a data input circuit, a noise current limiting circuit or a reverse current protection circuit (hereinafter, simply "limiting circuit"), a manipulatable switch (e.g., a trigger), a motor, a motor drive circuit (e.g., a PWM circuit), and a drive mechanism (e.g., a gear transmission).

The equipment positive electrode terminal is adapted/configured to be electrically connected to the positive electrode of the battery in response to the electric work machine entering the connected state (e.g., when the battery pack is mounted on the electric work machine). The equipment negative electrode terminal is adapted/configured to be electrically connected to the negative electrode of the battery in response to the electric work machine entering the connected state. The equipment communication terminal is adapted/configured to be electrically connected to the battery pack in response to the electric work machine entering the connected state. The data output circuit may comprise at least an output terminal, which is electrically connected to the equipment communication terminal, and is adapted/configured to output equipment transmit-data (one or more signals containing data/instructions generated and output by the electric work machine) from the output terminal. The data input circuit may comprise at least an input terminal, which is electrically connected to the equipment communication terminal, and a ground terminal, which is electrically connected to the equipment negative electrode terminal. The data input circuit may be adapted/configured such that battery transmit-data (one or more signals containing data regarding the battery, such as, e.g., current voltage, current temperature, etc.), which has been input (transmitted) from the battery pack to the equipment communication terminal, is input to (at) the input terminal. The limiting circuit is adapted/configured to at least limit a flow of electric current in the direction from from the equipment negative electrode terminal to the equipment communication terminal via the data input circuit. That is, the limiting circuit is preferably designed to at least limit the flow of electric current (e.g., noise) in the direction that is opposite (reverse) of the direction that the battery-transmit data moves (flows) from the equipment communication terminal to the input terminal. The limiting circuit is preferably designed to not limit the flow of electric current (e.g., signals) in the direction that the battery-transmit data moves (flows) from the equipment communication terminal to the input terminal.

The manipulatable switch is manipulated by a user of the electric work machine to control operation/drive of the motor. The motor drive circuit is adapted/configured to drive the motor, using electric power supplied from the battery pack through the equipment positive electrode terminal and the equipment negative electrode terminal, in response to the manipulatable switch being manipulated. The drive mechanism is adapted/configured to detachably mount or attach a work output member (e.g., a tool accessory) thereon or such that the work output member (e.g., a tool accessory) is integrally (permanently) affixed to the drive mechanism. The drive mechanism is adapted/configured to cause the work output member to act on a work target by transmitting a rotational drive force of the motor and driving (e.g., moving) the work output member using that rotational drive force.

With such an embodiment an electric work machine, because the limiting circuit is provided, the flow of electric current in the direction from the data input circuit to the equipment communication terminal and, in turn, the input of that electric current to the battery pack is limited e.g., below a level that does not detrimentally affect the signal integrity of the battery-transmit data. Consequently, data communication between the battery pack and the electric work machine can be executed (performed) more accurately owing to the limiting circuit.

In yet another aspect of the present disclosure, a charger adapted/configured to be selectively placed in a connected state, in which the charger has been electrically connected to a battery pack comprising a battery (in particular, when the battery pack is mounted on the charger to initiate a charging operation), and in a state, in which the connected state has been released (terminated).

The charger may comprise at least a charger positive electrode terminal, a charger negative electrode terminal, a charger communication terminal, a data output circuit, a data input circuit, a noise current limiting circuit or a reverse current protection circuit (hereinafter, simply "limiting circuit"), and a charging circuit.

The charger positive electrode terminal is adapted/configured to be electrically connected to the positive electrode of the battery in response to the charger entering the connected state. The charger negative electrode terminal is adapted/configured to be electrically connected to the negative electrode of the battery in response to the charger entering the connected state. The charger communication terminal is adapted/configured to be electrically connected to the battery pack in response to the charger entering the connected state. The data output circuit may comprise at least an output terminal, which is electrically connected to the charger communication terminal, and is adapted/configured to output charger transmit-data (one or more signals containing data/instructions generated and output by the charger) from the output terminal. The data input circuit may comprise at least an input terminal, which is electrically connected to the charger communication terminal, and a ground terminal, which is electrically connected to the charger negative electrode terminal. The data input circuit may be adapted/configured such that battery transmit-data (one or more signals containing data regarding the battery, such as, e.g., current voltage, current temperature, etc.), which has been input (transmitted) from the battery pack to the charger communication terminal, is input to the input terminal. The limiting circuit is adapted/configured to at least limit a flow of electric current in a direction from the charger negative electrode terminal to the charger communication terminal via the data input circuit. That is, the limiting circuit is preferably designed to at least limit the flow of electric current (e.g., noise) in the direction that is opposite (reverse) of the direction that the battery-transmit data moves (flows) from the charger communication terminal to the input terminal. The limiting circuit is preferably designed to not limit the flow of electric current (e.g., signals) in the direction that the battery-transmit data moves (flows) from the charger communication terminal to the input terminal.

The charging circuit is adapted/configured such that electric power for charging the battery is output to the battery pack through the charger positive electrode terminal and the charger negative electrode terminal.

With such an embodiment of a charger, because the limiting circuit is provided, the flow of electric current in the direction from the data input circuit to the charger communication terminal and, in turn, the input of that electric current to the battery pack is limited e.g., below a level that does not detrimentally affect the signal integrity of the battery-transmit data. Consequently, data communication between the battery pack and the charger can be executed (performed) more accurately owing to the limiting circuit.

Further objects, aspects, embodiments and advantages of the present teachings will become apparent to a person skilled in the art upon reading the following detailed description in conjunction with the appended claims and drawings.

DETAILED DESCRIPTION OF THE INVENTION

Exemplary, non-limiting embodiments of the present disclosure are explained below, with reference to the drawings.

1. FIRST EMBODIMENT (1-1) Overview of an Exemplary Electric Work Machine System

Figure 1:
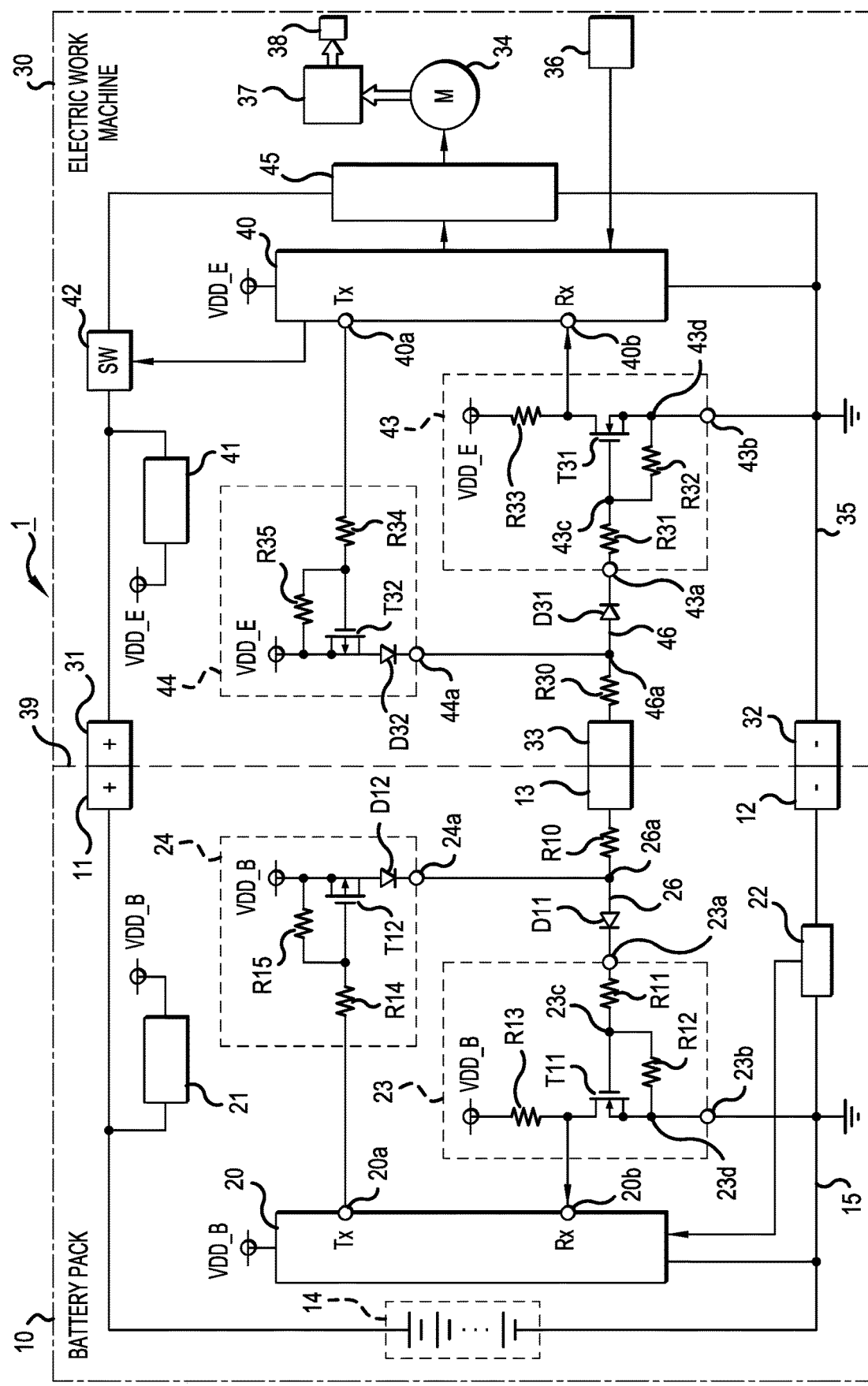
FIG. 1 is an explanatory diagram that shows the configuration of an electric work machine system according to a first embodiment of the present disclosure.

The electric work machine system 1 shown in FIG. 1 comprises: a battery pack 10, which comprises (contains) a battery 14; and an electric work machine 30. The electric work machine 30 is adapted/configured such that the battery pack 10 is mountable thereon and demountable (detachable, removable) therefrom. Specifically, the electric work machine 30 comprises a mounting part 39, and the battery pack 10 is mountable on and demountable from the mounting part 39.

As shown in FIG. 1, the battery pack 10 comprises a positive electrode terminal 11, a negative electrode terminal 12, and a communication terminal 13. The electric work machine 30 comprises a positive electrode terminal 31, a negative electrode terminal 32, and a communication terminal 33.

When the battery pack 10 is mounted on the electric work machine 30, the electric work machine system 1 enters an equipment-connected state, in which the electric work machine 30 and the battery pack 10 are electrically connected. In the equipment-connected state, as shown in FIG. 1, the positive electrode terminal 11 of the battery pack 10 and the positive electrode terminal 31 of the electric work machine 30 are electrically connected, the negative electrode terminal 12 of the battery pack 10 and the negative electrode terminal 32 of the electric work machine 30 are electrically connected, and the communication terminal 13 of the battery pack 10 and the communication terminal 33 of the electric work machine 30 are electrically connected.

When the electric work machine system 1 enters the equipment-connected state, it becomes possible for the electric work machine 30 to operate by receiving electric power (current) from the battery 14. When the battery pack 10, which had been mounted on the electric work machine 30, is demounted (removed) from the electric work machine 30, the equipment-connected state is released (terminated). In addition, when the electric work machine system 1 enters the equipment-connected state, data communication (e.g., half duplex serial communication) between the electric work machine 30 and the battery pack 10 becomes possible.

(1-2) Configuration of an Exemplary Battery Pack

As shown in FIG. 1, in addition to the positive electrode terminal 11, the negative electrode terminal 12, the communication terminal 13, and the battery 14 described above, the battery pack 10 further comprises a battery control circuit (e.g., a microprocessor unit comprising at least one processor, memory having operating programs and data stored therein and at least one I/O interface) 20, a power supply circuit 21, a current detection circuit 22, a data input circuit 23, and a data output circuit 24.

The battery 14 is a rechargeable battery, which is capable of being charged and discharged. The battery 14 may contain one or more battery cells of any kind of rechargeable battery, for example, one or more lithium ion battery cells. The rated voltage value of the battery 14 may be any value without limitation, for example, 36 V. Generally speaking, batteries 14 according to the present teachings may be adapted/configured to output any rated voltage within a range of about 10-100 V, such as, e.g., 14-40 V.

The positive electrode terminal 11 is electrically connected to the positive electrode of the battery 14. The negative electrode terminal 12 is electrically connected to the negative electrode of the battery 14. In greater detail, the negative electrode terminal 12 is electrically connected to the negative electrode of the battery 14 via the current detection circuit 22 and a ground line 15.

The current detection circuit 22 outputs, to the battery control circuit 20, a current detection signal corresponding to the value of the electric current flowing through a negative electrode path, which extends from the negative electrode terminal 12 to the negative electrode of the battery 14 via the ground line 15. The current detection circuit 22 may be any kind of circuit capable of detecting the value of the current momentarily flowing, e.g., from the battery 14 to the electric work machine 30 and/or from a charger to the battery 14. For example, the current detection circuit 22 may comprise a shunt resistor (not shown) that is inserted in (in series with) the negative electrode path. In the alternative, the current detection circuit 22 may be provided at a location that differs from the negative electrode path. In such an alternative embodiment, the negative electrode terminal 12 may be directly connected to the ground line 15.

The communication terminal 13 is electrically connected to the data input circuit 23 and to the data output circuit 24. In greater detail, a first end of a signal path 26 is connected to the communication terminal 13, and a second end of the signal path 26 is connected to the data input circuit 23. Thus, the communication terminal 13 is electrically connected to the data input circuit 23 via the signal path 26.

The data output circuit 24 is electrically connected to a connection point 26a in the signal path 26 and is electrically connected to the communication terminal 13 via the connection point 26a.

A resistor R10 is provided in (in series with) the signal path 26 between the connection point 26a and the communication terminal 13. A diode D11 is provided in (in series with) the signal path 26 between the connection point 26a and the data input circuit 23. Specifically, the anode of the diode D11 is electrically connected to the connection point 26a, and the cathode of the diode D11 is electrically connected to the data input circuit 23.

It is noted that the connection point 26a may be provided in the signal path 26 anywhere between the anode of the diode D11 and the communication terminal 13. For example, the connection point 26a may be provided between the resistor R10 and the communication terminal 13. In addition, for example, the connection point 26a may be provided in the signal path 26 at the end part to which the communication terminal 13 is connected (in other words, at the location of the communication terminal 13 to which the signal path 26 is connected).

The battery control circuit 20 controls the charging and the discharging of the battery 14 based on various types of information that are input into the battery control circuit 20, such as the current detection signal input from the current detection circuit 22.

The battery pack 10 of the present embodiment comprises a universal asynchronous receiver transmitter (UART) circuit, which is embodied in the data input circuit 23, the data output circuit 24, and the communication terminal 13. The battery control circuit 20 preferably performs half duplex serial communication with the electric work machine 30, which is connected to the battery pack 10 via the UART circuit.

The battery control circuit 20 comprises a Tx terminal 20a and an Rx terminal 20b. The battery control circuit 20 generates battery transmit-data (one or more signals) and outputs such from the Tx terminal 20a. The battery transmit-data, which has been output from the Tx terminal 20a, is transmitted to the electric work machine 30 via the data output circuit 24 and the communication terminal 13. Equipment transmit-data (one or more signals) is transmitted from the electric work machine 30. In the battery pack 10, this equipment transmit-data is input (received) at the communication terminal 13 and then input to the Rx terminal 20b via the data input circuit 23. In the present embodiment, the battery transmit-data and the equipment transmit-data are in each case implemented, for example, as a binary signal having an H level (high or "1") and an L level (low or "0").

The battery control circuit 20 executes (performs) data communication (serial communication) with the electric work machine 30 via the data input circuit 23 and the data output circuit 24 and controls the discharging of the battery 14 (i.e. the supply of power (current) to the connected equipment) in accordance with the equipment transmit-data received from the electric work machine 30.

The power supply circuit 21 generates a direct current control voltage VDD_B by stepping down the voltage of the battery 14. The control voltage VDD_B generated by the power supply circuit 21 is supplied to each component within the battery pack 10, including to the battery control circuit 20, the data input circuit 23, and the data output circuit 24.

The data input circuit 23 and the data output circuit 24 will now be explained in further detail. As shown in FIG. 1, the data input circuit 23 comprises a switching device T11, resistors R11, R12, R13, an input terminal 23a, and a ground terminal 23b. In the present embodiment, the switching device T11 is, for example, an n-channel MOSFET.

The second end of the signal path 26 is electrically connected to the input terminal 23a. That is, the cathode of the diode D11, which is provided in the signal path 26, is electrically connected to the input terminal 23a. Thereby, the equipment transmit-data, which has been input (transmitted) from the electric work machine 30 to the communication terminal 13, is input to the input terminal 23a via the signal path 26 (i.e., via the resistor R10 and the diode D11). The ground terminal 23b is electrically connected to the ground line 15.

In the data input circuit 23, a first end of the resistor R11 is electrically connected to the input terminal 23a, and a second end of the resistor R11 is electrically connected to the gate (switch input terminal) of the switching device T11. The source (switch ground terminal) of the switching device T11 is electrically connected to the ground terminal 23b, and the drain of the switching device T11 is electrically connected both to a first end of the resistor R13 and to the Rx terminal 20b. The control voltage VDD_B is input to a second end of the resistor R13. A first end of the resistor R12 is electrically connected to a connection point 23c, and a second end of the resistor R12 is electrically connected to a connection point 23d. The connection point 23c is provided along (in series with) a path extending from the second end of the resistor R11 to the gate of the switching device T11. The connection point 23d is provided along (in series with) a path extending from the source of the switching device T11 to the ground terminal 23b.

In the above-described data input circuit 23, if the communication terminal 13 becomes H level (high) in response to the equipment transmit-data transmitted from the electric work machine 30, then the switching device T11 turns ON and an L-level (low) signal is output to the Rx terminal 20b. On the other hand, if the communication terminal 13 becomes L level (low) in response to the equipment transmit-data, the switching device T11 turns OFF and an H-level (high) signal is output to the Rx terminal 20b.

As shown in FIG. 1, the data output circuit 24 comprises a switching device T12, resistors R14, R15, a diode D12, and an output terminal 24a. In the present embodiment, the switching device T12 is, for example, a p-channel MOSFET. The output terminal 24a is electrically connected to the connection point 26a in the signal path 26.

A first end of the resistor R14 is electrically connected to the Tx terminal 20a, and a second end of the resistor R14 is electrically connected to the gate of the switching device T12. A first end of the resistor R15 is electrically connected to the gate of the switching device T12, and a second end of the resistor R15 is electrically connected to the source of the switching device T12. Control voltage VDD_B is input to the source of the switching device T12. The anode of the diode D12 is electrically connected to the drain of the switching device T12, and the cathode of the diode D12 is electrically connected to the output terminal 24a.

(1-3) Configuration of an Exemplary Electric Work Machine

As shown in FIG. 1, in addition to the positive electrode terminal 31, the negative electrode terminal 32, and the communication terminal 33 described above, the electric work machine 30 further comprises a motor 34, a manipulatable switch (e.g., trigger) 36, a drive mechanism (e.g., a speed-reducing gear transmission and/or a rotational-to-linear motion converting mechanism) 37, a drive control circuit (e.g., a microprocessor unit comprising at least one processor, memory having operating programs and data stored therein and at least one I/O interface) 40, a power supply circuit 41, a drive switch (e.g., a FET) 42, a data input circuit 43, a data output circuit 44, and a motor drive circuit (e.g., a pulse-width-modulation (PWM) drive circuit) 45.

The motor drive circuit 45 is connected both to the positive electrode terminal 31 (via the drive switch 42) and to the negative electrode terminal 32 and is adapted/configured to receive (input) electric power (current) from the battery 14 of the battery pack 10, which is mounted on the mounting part 39. In accordance with a drive instruction that has been input from the drive control circuit 40, the motor drive circuit 45 converts the electric power (current), which was supplied by the battery 14, into drive power (current, e.g., according to a pulse-width modulated duty cycle) for driving (powering) the motor 34 and supplies such drive power (current) to the motor 34.

The motor 34 rotates owing to the drive power supplied from the motor drive circuit 45. The motor 34 may be any kind of motor, such as, for example, a brushless motor or a brushed DC motor.

A work output member (e.g., a tool accessory) 38 is provided on an output end/portion of the drive mechanism 37. The work output member 38 may be affixed to (integral with) the drive mechanism 37 (e.g., to/with a spindle thereof) or may be removable or detachable from the drive mechanism 37. The rotational drive force generated by the rotation of the motor 34 is transmitted to the drive mechanism 37. Using the rotational drive force transmitted from the motor 34, the drive mechanism 37 drives the work output member 38 attached to the drive mechanism 37, e.g., rotationally, linearly and/or both rotationally and linearly.

The work output member 38 acts on a work target, which is external to (separate from) the electric work machine 30; in other words, the work output member 38 is adapted/configured to achieve or realize the function (intended purpose) of the electric work machine 30 by imparting energy to the work target. The work output member 38 may be, for example, a rotary blade adapted/configured to rotate in order to mow grass, brush cut small diameter trees, or the like. In the alternative, for example, the work output member 38 may be a drill bit adapted/configured to rotate in order to drill a hole in a workpiece. In the alternative, for example, the work output member 38 may be a fan that is rotated in order to blow or suck air (which is the work target in this embodiment).

The drive switch 42 for making conductive and interrupting the conducting path is provided in (in series with) the conducting path between the positive electrode terminal 31 and the motor drive circuit 45. The drive switch 42 is turned ON and OFF by the drive control circuit 40.

The manipulatable switch 36 is designed to be manipulated or moved (e.g., squeezed, pulled) by a user of the electric work machine 30. In response to the manipulatable switch 36 being manipulated, the drive control circuit 40 causes the motor 34 to be rotationally driven by turning the drive switch 42 ON to make the above-described conducting path conductive and then outputting a drive instruction to the motor drive circuit 45.

The communication terminal 33 is electrically connected to the data input circuit 43 and to the data output circuit 44. In greater detail, a first end of a signal path 46 is electrically connected to the communication terminal 33, and a second end of the signal path 46 is electrically connected to the data input circuit 43. The communication terminal 33 is electrically connected to the data input circuit 43 via the signal path 46.

The data output circuit 44 is electrically connected to a connection point 46a and is electrically connected to the communication terminal 33 via the connection point 46a. A resistor R30 is provided in (in series with) the signal path 46 between the connection point 46a and the communication terminal 33. A diode D31 is provided in (in series with) the signal path 46 between the connection point 46a and the data input circuit 43. Specifically, the anode of the diode D31 is electrically connected to the connection point 46a, and the cathode of the diode D31 is electrically connected to the data input circuit 43.

It is noted that the connection point 46a may be provided in the signal path 46 anywhere between the anode of the diode D31 and the communication terminal 33. For example, the connection point 46a may be provided between the resistor R30 and the communication terminal 33. In the alternative, for example, the connection point 46a may be provided in the signal path 46 at the end part to which the communication terminal 33 is connected (in other words, at the location of the communication terminal 33 to which the signal path 46 is connected).

The electric work machine 30 of the present embodiment comprises the UART circuit, which is embodied by the data input circuit 43, the data output circuit 44, and the communication terminal 33. The drive control circuit 40 executes (performs) half duplex serial communication with the battery pack 10, which is connected to the electric work machine 30, via the UART circuit.

The drive control circuit 40 comprises a Tx terminal 40a and an Rx terminal 40b. The drive control circuit 40 generates the above-described equipment transmit-data and outputs such from the Tx terminal 40a. The equipment transmit-data, which has been output from the Tx terminal 40a, is transmitted to the battery pack 10 via the data output circuit 44 and the communication terminal 33. The battery transmit-data transmitted from the battery pack 10 is, in the electric work machine 30, received (input) at the communication terminal 33 and input to the Rx terminal 40b via the data input circuit 43.

The power supply circuit 41 generates a direct current control voltage VDD_E by stepping down the voltage of the battery 14, which is input from the battery pack 10 mounted on the electric work machine 30. The control voltage VDD_E generated by the power supply circuit 41 is supplied to each component within the electric work machine 30, including the drive control circuit 40, the data input circuit 43, and the data output circuit 44. It is noted that the value of control voltage VDD_E may be the same as or different from the value of control voltage VDD_B generated by the battery pack 10.

The data input circuit 43 and the data output circuit 44 will now be explained in further detail. As shown in FIG. 1, the data input circuit 43 comprises a switching device T31, resistors R31, R32, R33, an input terminal 43a, and a ground terminal 43b. In the present embodiment, the switching device T31 is, for example, an n-channel MOSFET.

The second end of the signal path 46 is electrically connected to the input terminal 43a. That is, the cathode of the diode D31, which is provided in the signal path 46, is electrically connected to the input terminal 43a. Thereby, the battery transmit-data, which has been input (transmitted) from the battery pack 10 to the communication terminal 33, is input to the input terminal 43a via the signal path 46 (i.e., via the resistor R30 and the diode D31). The ground terminal 43b is electrically connected to a ground line 35. The negative electrode terminal 32 and the motor drive circuit 45 are electrically connected to the ground line 35.

In the data input circuit 43, a first end of the resistor R31 is electrically connected to the input terminal 43a, and a second end of the resistor R31 is electrically connected to the gate (switch input terminal) of the switching device T31. The source (switch ground terminal) of the switching device T31 is electrically connected to the ground terminal 43b, and the drain of the switching device T31 is electrically connected both to a first end of the resistor R33 and to the Rx terminal 40b. The control voltage VDD_E is input to a second end of the resistor R33.

A first end of the resistor R32 is electrically connected to a connection point 43c, and a second end of the resistor R32 is electrically connected to a connection point 43d. The connection point 43c is provided along (in series with) a path extending from the second end of the resistor R31 to the gate of the switching device T31. The connection point 43d is provided along (in series with) a path extending from the source of the switching device T31 the ground terminal 43b.

In the above-described data input circuit 43, if the communication terminal 33 becomes H level (high or "1") in response to the battery transmit-data from the battery pack 10, then the switching device T31 turns ON and an L-level signal (low or "0") is output to the Rx terminal 40b. On the other hand, if the communication terminal 33 becomes L level in response to the battery transmit-data, the switching device T31 turns OFF and an H-level signal is output to the Rx terminal 40b.

As shown in FIG. 1, the data output circuit 44 comprises a switching device T32, resistors R34, R35, a diode D32, and an output terminal 44a. In the present embodiment, the switching device T32 is, for example, a p-channel MOSFET. The output terminal 44a is connected to the connection point 46a.

A first end of the resistor R34 is electrically connected to the Tx terminal 40a of the drive control circuit 40, and a second end of the resistor R34 is electrically connected to the gate of the switching device T32. A first end of the resistor R35 is electrically connected to the gate of the switching device T32, and a second end of the resistor R35 is electrically connected to the source of the switching device T32. Control voltage VDD_E is input to the source of the switching device T32. The anode of the diode D32 is electrically connected to the drain of the switching device T32, and the cathode of the diode D32 is electrically connected to the output terminal 44a.

(1-4) Overview of an Exemplary Charging System

Figure 2:
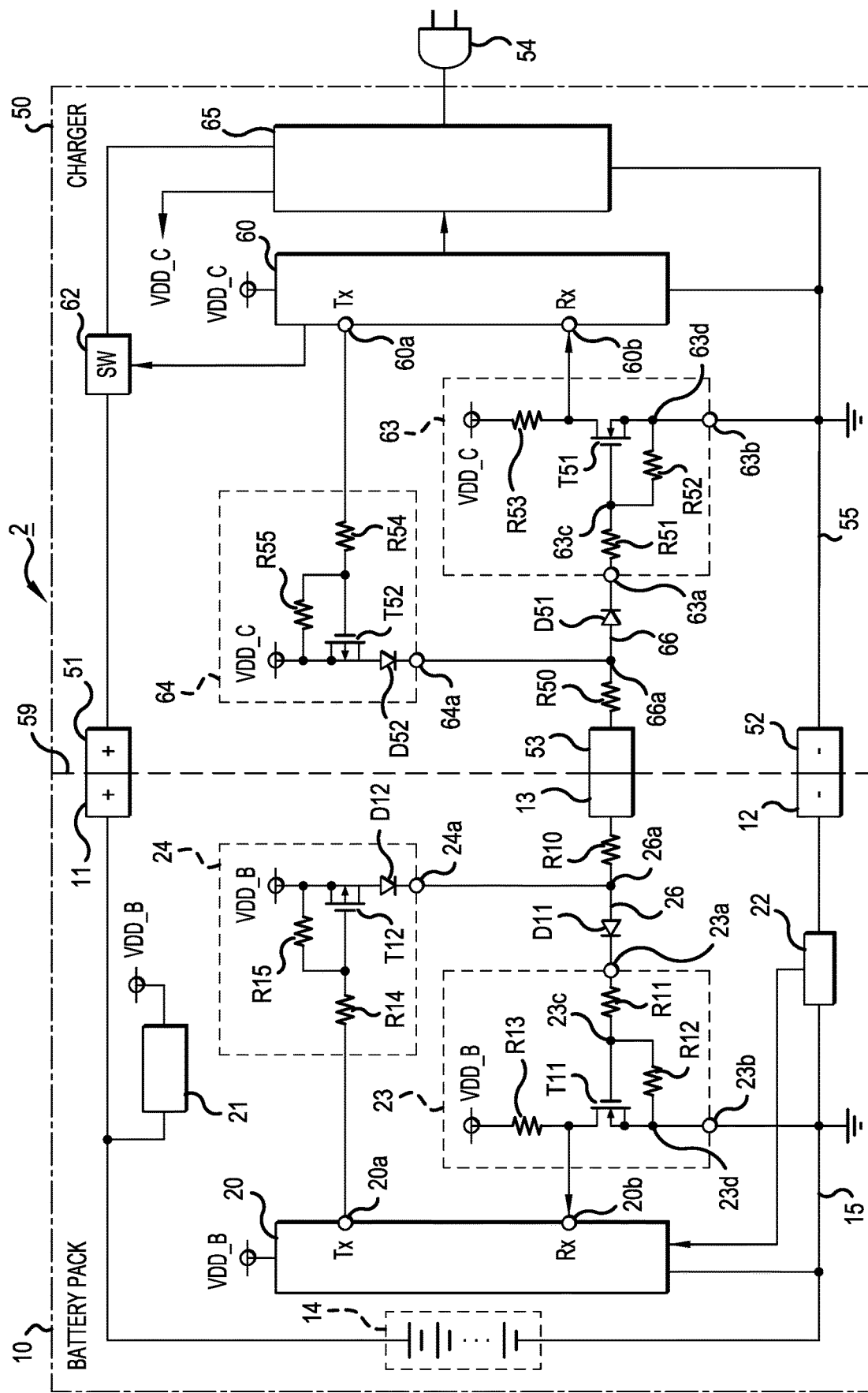
FIG. 2 is an explanatory diagram that shows the configuration of a charging system according to the first embodiment.

The charging system 2 shown in FIG. 2 comprises the battery pack 10 and a charger 50. The battery pack 10 shown in FIG. 2 is the same as the battery pack 10 shown in FIG. 1. The charger 50 is adapted/configured such that the battery pack 50 is mountable thereon and demountable therefrom. Specifically, the charger 50 comprises a mounting part 59, and the battery pack 10 is mountable on and demountable from the mounting part 59.

As shown in FIG. 2, the charger 50 comprises a positive electrode terminal 51, a negative electrode terminal 52, and a communication terminal 53. When the battery pack 10 is mounted on the charger 50, the charging system 2 enters a charger-connected state, in which the charger 50 and the battery pack 10 are electrically connected. In the charger-connected state, as shown in FIG. 2, the positive electrode terminal 11 of the battery pack 10 and the positive electrode terminal 51 of the charger 50 are electrically connected, the negative electrode terminal 12 of the battery pack 10 and the negative electrode terminal 52 of the charger 50 are electrically connected, and the communication terminal 13 of the battery pack 10 and the communication terminal 53 of the charger 50 are electrically connected.

When the charging system 2 enters the charger-connected state, it becomes possible for the charger 50 to supply charging power (current) to the battery pack 10 and thereby charge the battery 14. When the battery pack 10, which has been mounted on the charger 50, is demounted from the charger 50, the charger-connected state is released (terminated). In addition, when the charging system 2 enters the charger-connected state, data communication (e.g., half duplex serial communication) between the charger 50 and the battery pack 10 becomes possible.

(1-5) Configuration of an Exemplary Charger

As shown in FIG. 2, in addition to the positive electrode terminal 51, the negative electrode terminal 52, and the communication terminal 53 described above, the charger 50 further comprises a power supply plug 54, a charger control circuit (e.g., a microprocessor unit comprising at least one processor, memory having operating programs and data stored therein and at least one I/O interface) 60, a charger switch (e.g., a FET) 62, a data input circuit 63, a data output circuit 64, and a charger power supply circuit 65.

The power supply plug 54 is electrically connected to an AC power supply, for example, a commercial power supply that supplies 110 or 220 VAC, and is adapted/configured to receive AC electrical power from the AC power supply.

The charger power supply circuit 65 generates, from the AC electrical power that is input via the power supply plug 54 (i.e. via a power cord that electrically connects the plug 54 and the charger power supply circuit 65), the charging power for charging the battery 14. The charger power supply circuit 65 is electrically connected to the positive electrode terminal 51 via the charger switch 62 and is electrically connected to the negative electrode terminal 52. The charging power generated by the charger power supply circuit 65 is supplied, via the positive electrode terminal 51 and the negative electrode terminal 52, to the battery pack 10, which has been mounted on the charger 50.

The charger switch 62 is provided along (in series with) a charging path, extending between the charger power supply circuit 65 and the positive electrode terminal 51, for outputting the charging power. The charger switch 62 is configured/adapted to make the charging path conductive and to interrupt the charging path.

The charger control circuit 60 controls the charger power supply circuit 65 and the charger switch 62. When the battery pack 10 is mounted on the charger 50 and charging of the battery 14 is possible, the charger control circuit 60 makes the above-described charging path conductive by turning the charger switch 62 ON and thereby supplies charging power to the battery pack 10 by causing the charger power supply circuit 65 to generate charging power.

It is noted that the charger power supply circuit 65 has a function (intended purpose) of generating a direct current control voltage VDD_C from the AC power supply, which has been input via the power supply plug 54. Control voltage VDD_C generated by the charger power supply circuit 65 is supplied to every component within the charger 50, including the charger control circuit 60, the data input circuit 63, and the data output circuit 64. It is noted that the value of control voltage VDD_C may be the same as or different from the value of control voltage VDD_B generated by the battery pack 10.

The communication terminal 53 is electrically connected to the data input circuit 63 and the data output circuit 64. In greater detail, a first end of a signal path 66 is electrically connected to the communication terminal 53, and a second end of the signal path 66 is electrically connected to the data input circuit 63. The communication terminal 53 is electrically connected to the data input circuit 63 via the signal path 66.

The data output circuit 64 is electrically connected to a connection point 66a in the signal path 66 and is electrically connected to the communication terminal 53 via the connection point 66a.

A resistor R50 is provided in (in series with) the signal path 66 between the connection point 66a and the communication terminal 53. A diode D51 is provided in (in series with) the signal path 66 between the connection point 66a and the data input circuit 63. Specifically, the anode of the diode D51 is electrically connected to the connection point 66a, and the cathode of the diode D51 is electrically connected to the data input circuit 63.

It is noted that the connection point 66a may be provided in the signal path 66 anywhere between the anode of the diode D51 and the communication terminal 53. For example, the connection point 66a may be provided between the resistor R50 and the communication terminal 53. In addition, for example, the connection point 66a may be provided in the signal path 66 at the end part to which the communication terminal 53 is connected (in other words, at the location of the communication terminal 53 to which the signal path 66 is connected).

The charger 50 of the present embodiment comprises the UART circuit, which is embodied by the data input circuit 63, the data output circuit 64, and the communication terminal 53. The charger control circuit 60 performs half duplex serial communication with the battery pack 10, which is connected to the charger 50, via the UART circuit.

The charger control circuit 60 comprises a Tx terminal 60a and an Rx terminal 60b. The charger control circuit 60 generates the charger transmit-data (one or more signals, e.g., comprising charging instructions) and outputs such from the Tx terminal 60a. The charger transmit-data output from the Tx terminal 60a is transmitted to the battery pack 10 via the data output circuit 64 and the communication terminal 53. The battery transmit-data transmitted from the battery pack 10 is, in the charger 50, input at the communication terminal 53 and the input to the Rx terminal 60b via the data input circuit 63.

The data input circuit 63 and the data output circuit 64 will now be explained in further detail. As shown in FIG. 2, the data input circuit 63 comprises a switching device T51, resistors R51, R52, R53, an input terminal 63a, and a ground terminal 63b. In the present embodiment, the switching device T51 is, for example, an n-channel MOSFET.

The second end of the signal path 66 is electrically connected to the input terminal 63a. That is, the cathode of the diode D51, which is provided in the signal path 66, is electrically connected to the input terminal 63a. Thereby, the battery transmit-data, which has been input from the battery pack 10 to the communication terminal 53, is input (transmitted) to the input terminal 63a via the signal path 66 (i.e., via the resistor R50 and the diode D51). The ground terminal 63b is electrically connected to a ground line 55. The negative electrode terminal 52 and the charger power supply circuit 65 are electrically connected to the ground line 55.

In the data input circuit 63, a first end of the resistor R51 is electrically connected to the input terminal 63a, and a second end of the resistor R51 is electrically connected to the gate (switch input terminal) of the switching device T51. The source (switch ground terminal) of the switching device T51 is electrically connected to the ground terminal 63b, and the drain of the switching device T51 is electrically connected both to a first end of the resistor R53 and to the Rx terminal 60b. The control voltage VDD_C is input to a second end of the resistor R53. A first end of the resistor R52 is electrically connected to a connection point 63c, and a second end of the resistor R52 is electrically connected to a connection point 63d. The connection point 63c is provided along (in series with) a path extending from the second end of the resistor R51 to the gate of the switching device T51. The connection point 63d is provided along (in series with) a path extending from the source of the switching device T51 to the ground terminal 63b.

In the above-described data input circuit 63, if the communication terminal 53 becomes H level (high or "1") in response to the battery transmit-data from the battery pack 10, then the switching device T51 turns ON and an L-level signal (low or "0") is output to the Rx terminal 60b. On the other hand, if the communication terminal 53 becomes L level in response to the battery transmit-data, the switching device T51 turns OFF and an H-level signal is output to the Rx terminal 60b.

As shown in FIG. 2, the data output circuit 64 comprises a switching device T52, resistors R54, R55, a diode D52, and an output terminal 64a. In the present embodiment, the switching device T52 is, for example, a p-channel MOSFET. The output terminal 64a is connected to the connection point 66a.

A first end of the resistor R54 is electrically connected to the Tx terminal 60a, and a second end of the resistor R54 is electrically connected to the gate of the switching device T52. A first end of the resistor R55 is electrically connected to the gate (switch input terminal) of the switching device T52, and a second end of the resistor R55 is electrically connected to the source (switch ground terminal) of the switching device T52. Control voltage VDD_C is input to the source of the switching device T52. The anode of the diode D52 is electrically connected to the drain of the switching device T52, and the cathode of the diode D52 is electrically connected to the output terminal 64a.

(1-6) Noise Current Limiting (Protection) Function and Effects Thereof

Next, a noise current limiting (protection) function, which the electric work machine system 1 and the charging system 2 of the present embodiment possess, and the effects thereof will be explained.

First, it is noted that the electric work machine system 1 shown in FIG. 1 utilizes a single communication path (i.e. the connection terminals 13, 33) to communicate signals from the battery pack 10 to the electric work machine 30 and vice versa. Thus, a half-duplex communication system is preferably used, because it enables communications in two directions, but only one direction at a time. In half-duplex systems, if signals, voltages, etc. are transmitted in both directions at the same time (e.g., a signal in one direction and noise in the other direction), a collision may occur, thereby possibly resulting in a lost message/signal.

More specifically, the electric work machine system 1 shown in FIG. 1 includes a closed loop that, in clockwise order in FIG. 1 starting from, for example, the negative electrode terminal 12 of the battery pack 10, includes the current detection circuit 22, the connection point of the ground line 15 with the data input circuit 23, the data input circuit 23 (including the resistor R12), the signal path 26, the communication terminal 13, the communication terminal 33 of the electric work machine 30, the signal path 46, the data input circuit 43 (including the resistor R32), and the connection point of the ground line 35 with the data input circuit 43, from which the closed loop returns to the negative electrode terminal 12 of the battery pack 10 via the negative electrode terminal 32.

If an unintended noise current were to flow through the above-described closed loop, e.g., owing to noise generated during the drive of the motor 34 in the electric work machine 30 or various other factors, while a signal is being transmitted in the opposite direction, then there is a possibility that the battery control circuit 20 or the drive control circuit 40 will be affected by that noise current and will become incapable to accurately receive data such that the signal is lost while the noise current is flowing. More specifically, if a noise current flows, for example, in the direction from the communication terminal 13 of the battery pack 10 in the above mentioned closed loop toward the communication terminal 33 of the electric work machine 30 (i.e., in the clockwise direction in FIG. 1) while battery transmit-data is being transmitted by the battery pack 10 in the opposite direction, then there is a possibility that the drive control circuit 40 of the electric work machine 30 will not be able to accurately receive the battery transmit-data while this noise current is flowing owing to a collision between the battery transmit-data and the noise current. Conversely, if a noise current flows in the direction from the communication terminal 33 of the electric work machine 30 in the above mentioned closed loop toward the communication terminal 13 of the battery pack 10 (i.e., in the counterclockwise direction in FIG. 1) while equipment transmit-data is being transmitted by the electric work machine 30 or charger 50 in the opposite direction, then there is a possibility that the battery control circuit 20 of the battery pack 10 will not be able to accurately receive the equipment transmit-data while this noise current is flowing owing to a collision between the equipment transmit-data and the noise current. In other words, the noise (voltage) moving in one direction may affect (offset) the signal (voltage) moving in the opposite direction to an extent that the signal integrity is lost and the signal can not be properly received/discerned at the intended receiver.

Accordingly, in the electric work machine system 1 according to the present embodiment, in order to sufficiently limit or even block undesirable noise currents flowing in the closed loop, the diode D11 is provided in the signal path 26 of the battery pack 10, and the diode D31 is provided in the signal path 46 of the electric work machine 30. Noise currents that flow clockwise through the closed loop are limited (e.g., at least partially blocked, truncated, reduced, or the like) by the diode D11 of the battery pack 10, thereby providing reverse current protection. Noise currents that flow counterclockwise through the closed loop are limited (e.g., at least partially blocked, truncated, reduced, diminished or the like) by the diode D31 of the electric work machine 30 or the diode D51 of the charger 50. That is, in principle, diodes are asymmetrically conductive such that the diode has low resistance in one direction (cathode to anode) and a high resistance in the other direction (anode to cathode). The noise-limiting diodes D11, D31, D51 are arranged so that signals can pass in the direction of low resistance, whereas noise currents flowing in the opposite direction are at least substantially reduced so that any noise that passes through the diode D11, D31, D51 (i.e. in the direction from the anode to the cathode) does not detrimentally influence or affect the signal integrity of the desired signals moving in the opposite direction (i.e. in the direction from the cathode to the anode).

Therefore, in the battery pack 10, the diode D11 is provided in the signal path 26 on the data input circuit 23 side of the connection point 26a. Consequently, any decrease in the quality (signal integrity) of the battery transmit-data, which is transmitted from the data output circuit 24 to the electric work machine 30 via the communication terminal 13, caused by a noise current flowing in the opposite direction is limited by the diode D11, whereby the effect of any noise currents on the battery transmit-data is suitably limited (restricted, diminished).

Similarly, in the electric work machine 30, the diode D31 is provided in the signal path 46 on the data input circuit 43 side of the connection point 46a. Consequently, any decrease in the quality (signal integrity) of the equipment transmit-data, which is transmitted from the data output circuit 44 to the battery pack 10 via the communication terminal 33, caused by a noise current flowing in the opposite direction is limited by the diode D31, whereby the effect of any noise currents on the equipment transmit-data is suitably limited (restricted, diminished).

The charging system 2 shown in FIG. 2 likewise has a closed loop, the same as in the electric work machine system 1. In the charging system 2, too, there is a possibility that, owing to various factors, noise currents will be generated and flow such that they circulate through the closed loop. However, in the charging system 2 according to the present embodiment, the diode D11 is provided in the signal path 26 of the battery pack 10, and the diode D51 is provided in the signal path 66 of the charger 50. Consequently, in the charging system 2, too, noise currents, which flow such that they circulate through the closed loop, are suitably limited (restricted, diminished) by the diodes D11 and D51, thereby providing reverse current protection.

More specifically, in the charger 50, the diode D51 is provided in the signal path 66 on the data input circuit 63 side of the connection point 66a. Consequently, any decrease in the quality (signal integrity) of the charger transmit-data, which is transmitted from the data output circuit 64 to the battery pack 10 via the communication terminal 53, caused by a noise current flowing in the opposite direction is limited by the diode D51, whereby the effect of the noise currents on the charger transmit-data is suitably limited (restricted, diminished).

It is noted that the electric work machine 30 and the charger 50 correspond to exemplary examples of connected equipment according to the present disclosure.

In the battery pack 10, the positive electrode terminal 11 corresponds to one example of a first positive electrode terminal and a pack positive electrode terminal in the present disclosure. The negative electrode terminal 12 corresponds to one example of a first negative electrode terminal and a pack negative electrode terminal in the present disclosure. The communication terminal 13 corresponds to one example of a first communication terminal and a pack communication terminal in the present disclosure. The data input circuit 23 corresponds to one example of a first data input circuit in the present disclosure. The input terminal 23a corresponds to one example of a first input terminal in the present disclosure. The ground terminal 23b corresponds to one example of a first ground terminal in the present disclosure. The switching device T11 corresponds to one example of a first switching device in the present disclosure. The gate of the switching device T11 corresponds to one example of a first switch input terminal in the present disclosure. The source of the switching device T11 corresponds to one example of a first switch ground terminal in the present disclosure. The resistor R12 corresponds to one example of a first resistor in the present disclosure. The conducting path connecting the connection point 23c and the connection point 23d and in which the resistor R12 is provided corresponds to one example of a first bias path in the present disclosure. The data output circuit 24 corresponds to one example of a first data output circuit in the present disclosure. The output terminal 24a corresponds to one example of a first output terminal in the present disclosure. The signal path 26 corresponds to one example of a first signal path in the present disclosure. The connection point 26a in the signal path 26 corresponds to one example of a first connection point in the present disclosure. The diode D11 corresponds to one example of a first limiting circuit, a first reverse current protection circuit, and a first diode in the present disclosure.

In the electric work machine 30, the positive electrode terminal 31 corresponds to one example of a second positive electrode terminal and an equipment positive electrode terminal in the present disclosure. The negative electrode terminal 32 corresponds to one example of a second negative electrode terminal and an equipment negative electrode terminal in the present disclosure. The communication terminal 33 corresponds to one example of a second communication terminal and an equipment communication terminal in the present disclosure. The data input circuit 43 corresponds to one example of a second data input circuit in the present disclosure. The input terminal 43a corresponds to one example of a second input terminal in the present disclosure. The ground terminal 43b corresponds to one example of a second ground terminal in the present disclosure. The switching device T31 corresponds to one example of a second switching device in the present disclosure. The gate of the switching device T31 corresponds to one example of a second switch input terminal in the present disclosure. The source of the switching device T31 corresponds to one example of a second switch ground terminal in the present disclosure. The resistor R32 corresponds to one example of a second resistor in the present disclosure. The conducting path connecting the connection point 43c and the connection point 43d and in which the resistor R32 is provided corresponds to one example of a second bias path in the present disclosure. The data output circuit 44 corresponds to one example of a second data output circuit in the present disclosure. The output terminal 44a corresponds to one example of a second output terminal in the present disclosure. The signal path 46 corresponds to one example of a second signal path in the present disclosure. The connection point 46a in the signal path 46 corresponds to one example of a second connection point in the present disclosure. The diode D31 corresponds to one example of a second limiting circuit, a second reverse current protection circuit, and a second diode in the present disclosure.

In the charger 50, the positive electrode terminal 51 corresponds to one example of the second positive electrode terminal and a charger positive electrode terminal in the present disclosure. The negative electrode terminal 52 corresponds to one example of the second negative electrode terminal and a charger negative electrode terminal in the present disclosure. The communication terminal 53 corresponds to one example of the second communication terminal and a charger communication terminal in the present disclosure. The data input circuit 63 corresponds to one example of the second data input circuit in the present disclosure. The input terminal 63a corresponds to one example of the second input terminal in the present disclosure. The ground terminal 63b corresponds to one example of the second ground terminal in the present disclosure. The switching device T51 corresponds to one example of the second switching device in the present disclosure. The gate of the switching device T51 corresponds to one example of the second switch input terminal in the present disclosure. The source of the switching device T51 corresponds to one example of the second switch ground terminal in the present disclosure. The resistor R52 corresponds to one example of the second resistor in the present disclosure. The conducting path connecting the connection point 63c and the connection point 63d and in which the resistor R52 is provided corresponds to one example of the second bias path in the present disclosure. The data output circuit 64 corresponds to one example of the second data output circuit in the present disclosure. The output terminal 64a corresponds to one example of the second output terminal in the present disclosure. The signal path 66 corresponds to one example of the second signal path in the present disclosure. The connection point 66a in the signal path 66 corresponds to one example of the second connection point in the present disclosure. The diode D51 corresponds to another example of the second limiting circuit, the second reverse current protection circuit, and the second diode in the present disclosure.

2. SECOND EMBODIMENT

An electric work machine system 3 according to a second embodiment will now be explained, with reference to FIG. 3. Because the basic configuration of the electric work machine system 3 according to the second embodiment is the same as that of the electric work machine system 1 according to the first embodiment, only those points of difference from the electric work machine system 1 will be explained below. It is noted that symbols in the second embodiment that are the same as those in the first embodiment indicate structural elements that are the same, and preceding explanations thereof are referenced.

In the electric work machine system 1 according to the above-described first embodiment, the diode D11 is provided in the signal path 26 of the battery pack 10 and the diode D31 is provided in the signal path 46 of the electric work machine 30.

Figure 3:
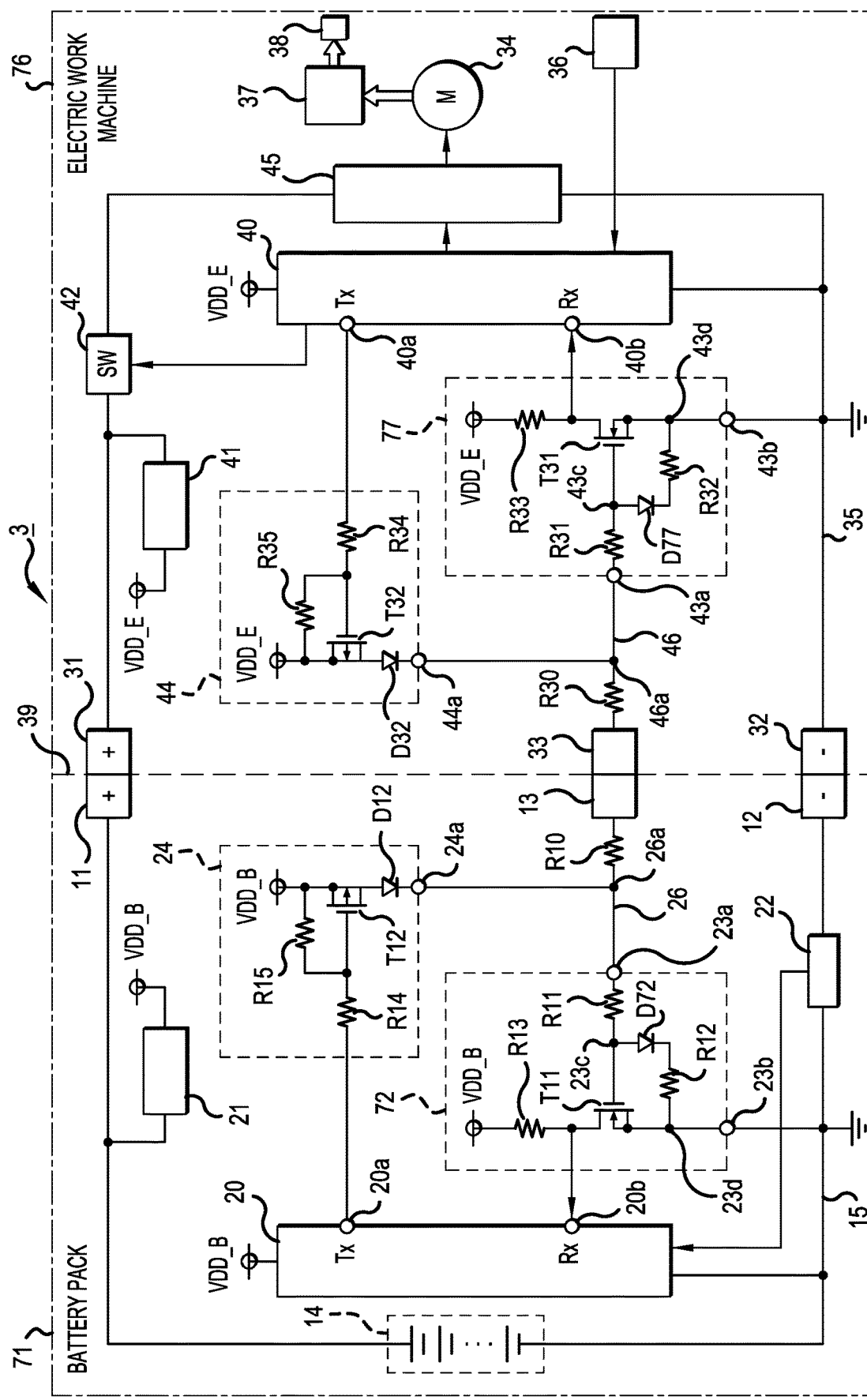
FIG. 3 is an explanatory diagram that shows the configuration of an electric work machine system according to a second embodiment of the present disclosure.

In contrast thereto, in the electric work machine system 3 according to the second embodiment, diode D72 is provided in battery pack 71 instead of the diode D11 of the first embodiment, as shown in FIG. 3. The diode D72 is provided within (in series with) a data input circuit 72 in a conducting path that extends from the connection point 23c to the connection point 23d via the resistor R12. Specifically, the anode of the diode D72 is electrically connected to the connection point 23c, and the cathode of the diode D72 is electrically connected to the first end of the resistor R12.

In an electric work machine 76, too, diode D77 is provided instead of the diode D31 of the first embodiment. The diode D77 is provided within (in series with) a data input circuit 77 in a conducting path that extends from the connection point 43c to the connection point 43d via the resistor R32. Specifically, the anode of the diode D77 is electrically connected to the connection point 43c, and the cathode of the diode D77 is electrically connected to the first end of the resistor R32.

In the above-described electric work machine system 3 according to the second embodiment, any noise currents generated (arising) within the closed loop are limited (at least partially blocked, truncated, reduced, diminished or the like) by the diode D72 and the diode D77. Moreover, in the battery pack 71, the diode D72 is provided in a path that is separate from the path extending from the communication terminal 13 to the gate of the switching device T11. Consequently, as compared to the electric work machine system 3 of the above-described first embodiment, the electric potential differential (i.e., the voltage drop) between the communication terminal 13 and the gate of the switching device T11 during reception of the equipment transmit-data is reduced. That is, because the diode D11 is provided between the gate of the switching device T11 and the communication terminal 13 in the first embodiment, the diode D11 will cause a voltage drop in the signal being transmitted from the communication terminal 13 to the gate of the switching device T11. Owing to the different location of the diode D72 of the second embodiment, it does not cause such a voltage drop at the gate of the switching device T11.

Figure 6:
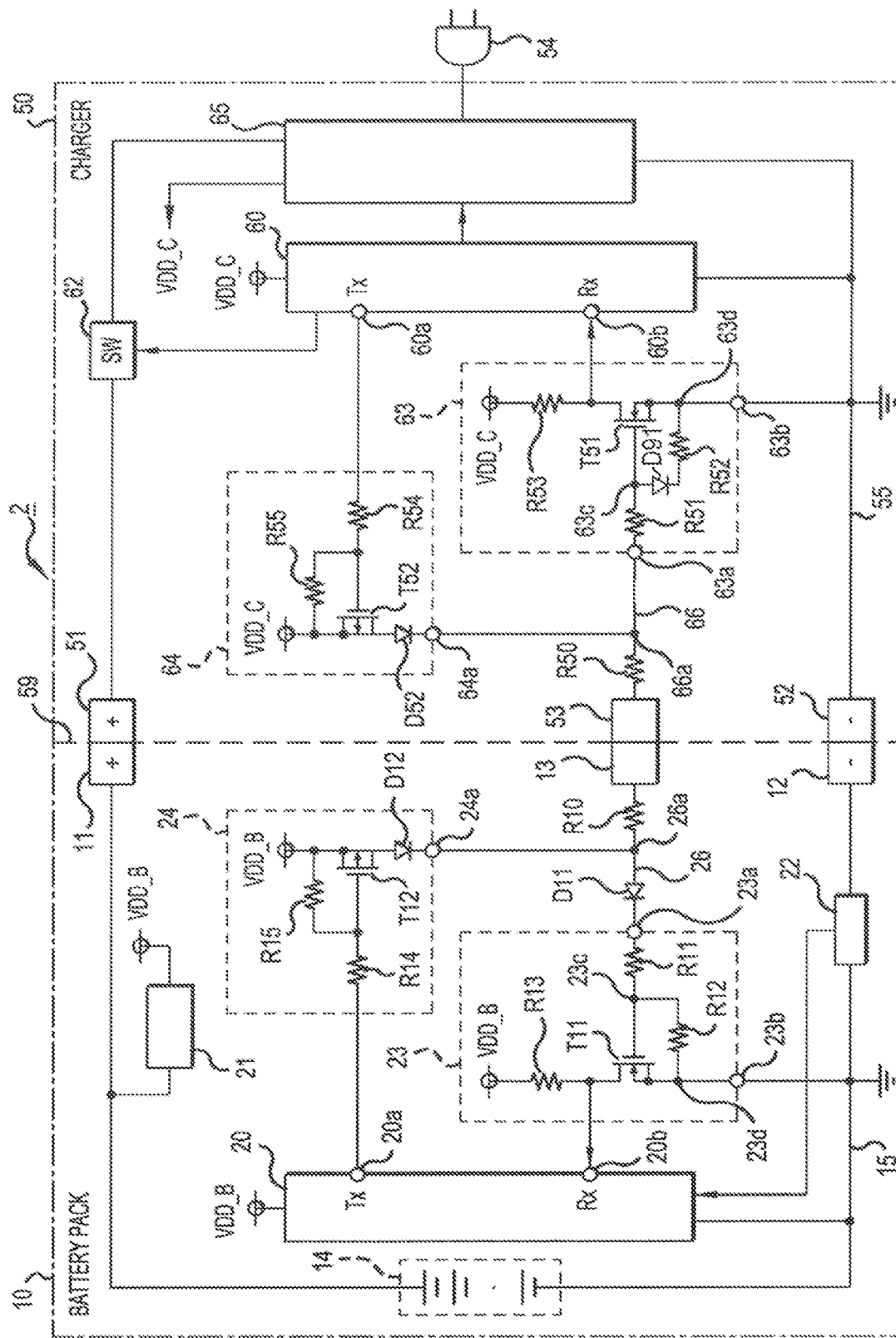
FIG. 6 is an explanatory diagram that shows a charging system according to a first modification of the charging system shown in FIG. 2.
Figure 7:
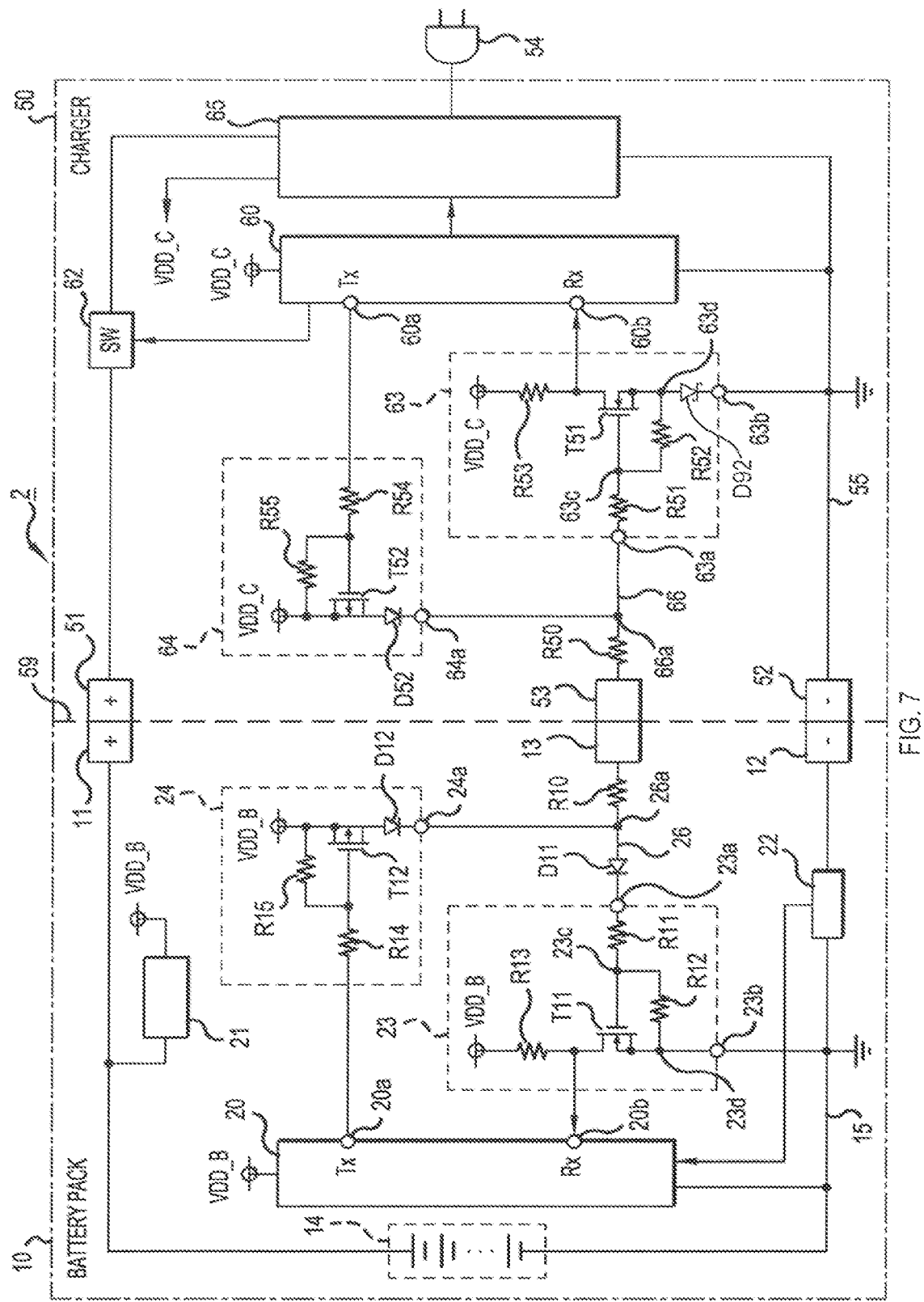
FIG. 7 is an explanatory diagram that shows a charging system according to a second modification of the charging system shown in FIG. 2.

It is noted that, in the charger 50 shown in FIG. 2, too, the diode D51 for limiting (reducing, diminishing) noise currents within the closed loop may be disposed the same as the diode D77 in the electric work machine 76 shown in FIG. 3. That is, as shown in FIG. 6, a diode D91 may be provided between the connection point 63c and the first end of the resistor R52.

3. THIRD EMBODIMENT

An electric work machine system 4 according to a third embodiment will now be explained, with reference to FIG. 4. Because the basic configuration of the electric work machine system 4 according to the third embodiment is the same as that of the electric work machine system 1 according to the first embodiment, only those points of difference from the electric work machine system 1 will be explained below. It is noted that symbols in the third embodiment that are the same as those in the first embodiment indicate structural elements that are the same, and preceding explanations thereof will be referenced.

Figure 4:
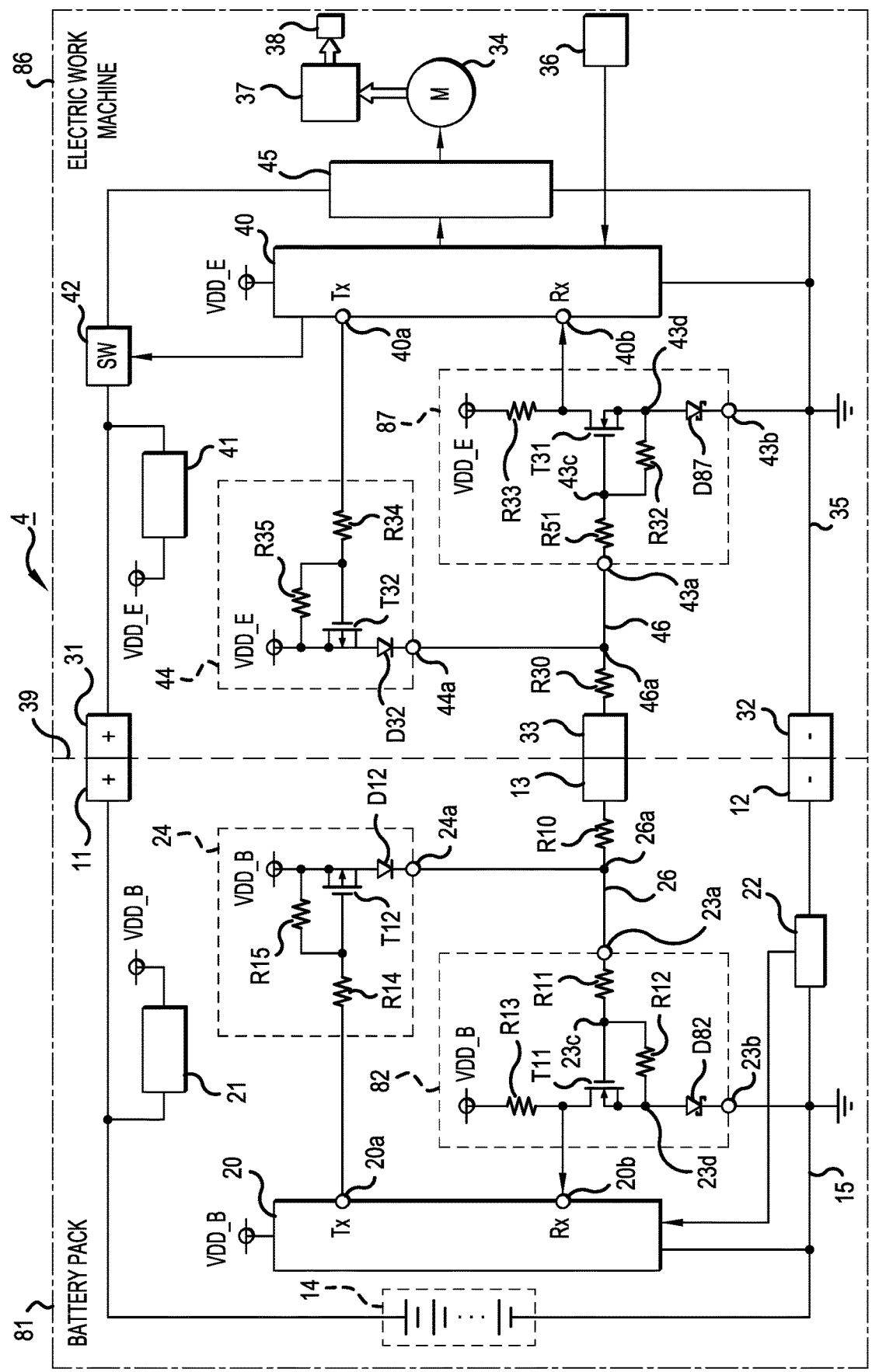
FIG. 4 is an explanatory diagram that shows the configuration of an electric work machine system according to a third embodiment of the present disclosure.

In the electric work machine system 4 according to the third embodiment, diode D82 is provided in battery pack 81 instead of the diode D11 of the first embodiment, as shown in FIG. 4. The diode D82 is provided within a data input circuit 82 between the connection point 23d and the ground terminal 23b. Specifically, the anode of the diode D82 is electrically connected to the connection point 23d, and the cathode of the diode D82 is electrically connected to the ground terminal 23b.

In electric work machine 86, too, diode D87 is provided instead of the diode D31 of the first embodiment. The diode D87 is provided within a data input circuit 87 between the connection point 43d and the ground terminal 43b. Specifically, the anode of the diode D87 is electrically connected to the connection point 43d, and the cathode of the diode D87 is electrically connected to the ground terminal 43b.

Both the diode D82 and the diode D87 may be, e.g., Schottky barrier diodes (or simply, "Schottky diodes") in the third embodiment. The principle reasons for using Schottky barrier diodes as the diode D82 and the diode D87 are as follows. That is, in the battery pack 81, if the switching device T11 turns ON in response to the equipment transmit-data from the electric work machine 86, then, in the battery control circuit 20, it should be determined that the value of the voltage input to the Rx terminal 20b is at the L level. However, owing to the magnitude of the forward voltage of the diode D82, there is a possibility that the value of the voltage input to the Rx terminal 20b will become high and not be determined to be at the L level in the battery control circuit 20. In the electric work machine 86, too, if the switching device T31 has turned ON, then there is a possibility that, owing to the magnitude of the forward voltage of the diode D87, the value of the voltage input to the Rx terminal 40b will not correctly be determined in the drive control circuit 40 to be at the L level.

Accordingly, in the third embodiment, Schottky barrier diodes, which have a lower forward voltage, are used as the diodes D82, D87. However, the diodes D82, D87 may be some other type of diodes that differs from Schottky barrier diodes.

In the above-described electric work machine system 4 according to the third embodiment, any noise currents generated (arising) within the closed loop are limited (reduced, diminished, etc.) by the diode D82 and the diode D87.

It is noted that, in the charger 50 shown in FIG. 2, too, the diode D51 for limiting noise currents within the closed loop may be disposed the same as the diode D87 in the electric work machine 86 shown in FIG. 4. That is, as shown in FIG.

7, a diode D92 may be provided between the connection point 63d and the ground terminal 63b. This diode D92 also may be, for example, a Schottky barrier diode.

4. FOURTH EMBODIMENT

Figure 5:
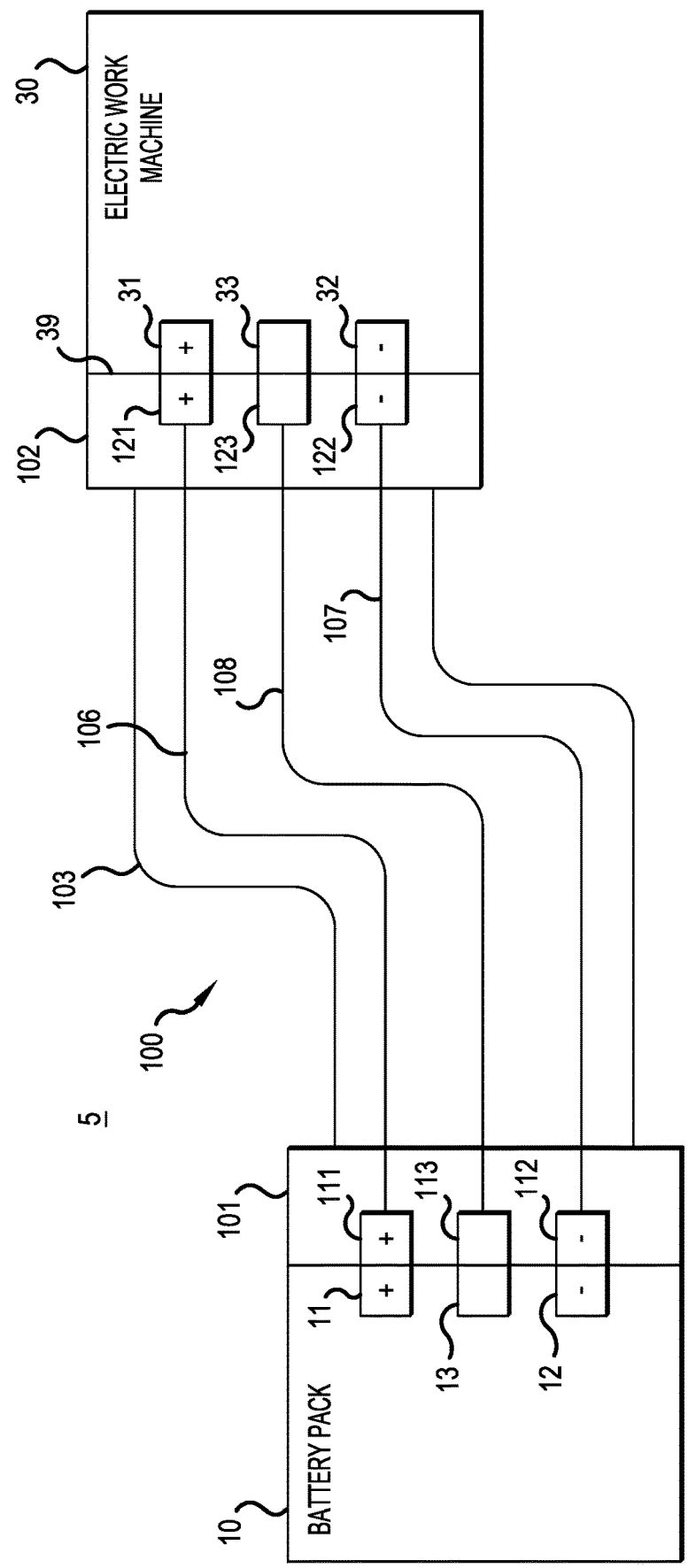
FIG. 5 is an explanatory diagram that shows the configuration of an electric work machine system according to a fourth embodiment of the present disclosure.

An electric work machine system 5 according to a fourth embodiment will now be explained, with reference to FIG. 5. The electric work machine system 5 shown in FIG. 5 comprises the battery pack 10, the electric work machine 30, and an intermediate device 100. The battery pack 10 and the electric work machine 30 are the same as the battery pack 10 and the electric work machine 30 according to the first embodiment as shown in FIG. 1. The intermediate device 100 also may be called, e.g., a remote adapter, a remote battery adapter, an umbilical battery adapter, a remote battery pod adapter or a corded battery-tool adapter.

The intermediate device 100 provides an electrical connection and a physical connection between the battery pack 10 and the electric work machine 30. The intermediate device 100 comprises a first mounting part 101, a second mounting part 102, and a cable 103. The first mounting part 101 is provided on a first end of the cable 103 and is adapted/configured such that the battery pack 10 is mountable thereon and demountable therefrom. The second mounting part 102 is provided on a second end of the cable 103 and is adapted/configured such that the electric work machine 30 is mountable thereon and demountable therefrom. The cable 103 is flexible. The cable 103 may have a length of, e.g., 1 meter, 2 meters, 3 meters, etc. or any length between 1-3 meters.

The first mounting part 101 comprises a first positive electrode intermediate terminal 111, a first negative electrode intermediate terminal 112, and a first communication intermediate terminal 113. When the battery pack 10 is mounted on (physically connected to) the first mounting part 101, the positive electrode terminal 11 of the battery pack 10 is electrically connected to the first positive electrode intermediate terminal 111, the negative electrode terminal 12 of the battery pack 10 is electrically connected to the first negative electrode intermediate terminal 112, and the communication terminal 13 of the battery pack 10 is electrically connected to the first communication intermediate terminal 113. The first mounting part 101 optionally may also include, e.g., a hook, a clip or other type of fastening device (not shown) that enables the first mounting part 101 (with the battery pack 10 mounted thereon) to be attached, e.g., to a user's belt, shoulder harness or other article of clothing or to a physical structure, such as a ladder. In the alternative, such a fastening device may be provided directly on the battery pack 10 or may be removably attachable to the battery pack 10.

The second mounting part 102 comprises a second positive electrode intermediate terminal 121, a second negative electrode intermediate terminal 122, and a second communication intermediate terminal 123. When the electric work machine 30 is mounted on (physically connected to) the second mounting part 102, the positive electrode terminal 31 of the electric work machine 30 is electrically connected to the second positive electrode intermediate terminal 121, the negative electrode terminal 32 of the electric work machine 30 is electrically connected to the second negative electrode intermediate terminal 122, and the communication terminal 33 of the electric work machine 30 is electrically connected to the second communication intermediate terminal 123.

The cable 103 comprises a positive electrode intermediate wire 106, a negative electrode intermediate wire 107, and a communication intermediate wire 108. The positive electrode intermediate wire 106 electrically connects the first positive electrode intermediate terminal 111 and the second positive electrode intermediate terminal 121. The negative electrode intermediate wire 107 electrically connects the first negative electrode intermediate terminal 112 and the second negative electrode intermediate terminal 122. The communication intermediate wire 108 electrically connects the first communication intermediate terminal 113 and the second communication intermediate terminal 123.

The above-described electric work machine system 5 makes it possible to use the electric work machine 30 while the electric work machine 30 is spaced apart from the battery pack 10, e.g., by one meter or more. Consequently, it becomes possible to provide an ergonomic electric work machine system 5, especially for applications in which the user has to hold the electric work machine 30, e.g., above the user's head for an extended period of time.

It is noted that the second mounting part 102 may be mounted on and demounted from the charger 50 shown in FIG. 2. That is, the battery pack 10 and the charger 50 also may be connectable to one another using the intermediate device 100.

5. OTHER EMBODIMENTS

Although embodiments of the present disclosure were explained above, the present disclosure is not limited to the embodiments described above, and it is understood that various modifications may be effected.

(5-1) In the battery pack, a limiting circuit for achieving the above-described noise current limiting function may be provided at a location different from that of the diode D11 (refer to FIG. 1), the diode D72 (refer to FIG. 3), and the diode D82 (refer to FIG. 4) described in the above mentioned embodiments.

For example, in the battery pack 10 shown in FIG. 1, a limiting circuit may be provided, instead of the diode D11, within the data input circuit 23 in the conducting path between the input terminal 23a and the connection point 23c (i.e., in the conducting path in which the resistor R11 is provided). More specifically, for example, a limiting circuit may be provided that comprises a diode whose anode is electrically connected to the input terminal 23a and whose cathode is electrically connected to the first end of the resistor R11. In addition, for example, a limiting circuit may be provided that comprises a diode whose anode is electrically connected to the second end of the resistor R11 and whose cathode is electrically connected to the connection point 23c.

In addition, for example, in the battery pack 71 shown in FIG. 3, a limiting circuit may be provided, instead of the diode D72, in the conducting path between the resistor R12 and the connection point 23d. More specifically, for example, a limiting circuit may be provided that comprises a diode whose anode is electrically connected to the second end of the resistor R12 and whose cathode is electrically connected to the connection point 23d.

In addition, for example, in the battery pack 81 shown in FIG. 4, a limiting circuit may be provided, instead of the diode D82, in the conducting path extending from the ground terminal 23b of the data input circuit 82 to the ground line 15. More specifically, for example, a limiting circuit may be provided that comprises a diode whose anode is electrically connected to the ground terminal 23b and whose cathode is electrically connected to the ground line 15.

(5-2) The same as the limiting circuit in the battery pack described in (5-1) above, the limiting circuit in the electric work machine and the limiting circuit in the charger likewise may be provided at locations that differ from the locations described in the above mentioned embodiments.

(5-3) The limiting circuit in the battery pack may differ from the limiting circuit in the connected equipment, which is connected to the battery pack.

(5-4) The location of the limiting circuit in the battery pack may differ from the location of the limiting circuit in the connected equipment, which is connected to the battery pack. Specifically, for example, in the electric work machine system 1 shown in FIG. 1, the location of the diode D11 in the battery pack 10 may be the same as shown in FIG. 1, while, in the electric work machine 30, the limiting circuit may be provided, instead of the diode D31, at a location separate/different from that of the diode D31. Conversely, the location of the diode D31 in the electric work machine 30 may be the same as shown in FIG. 1, while, in the battery pack 10, the limiting circuit may be provided, instead of the diode D11, at a location separate/different from that of the diode D11. This applies likewise to the charging system 2 shown in FIG. 2 and to the electric work machine systems 3, 4 shown in FIG. 3 and FIG. 4.

(5-5) The limiting circuit of the present disclosure may differ from a circuit that comprises a single diode, as described in the embodiments above. Limiting circuits of the present disclosure may be constituted without containing a diode to achieve the noise current limiting function described above by using a component or components or a circuit that differ from a diode. More specifically, the limiting circuit of the present disclosure may be, e.g., a reverse current protection circuit that reduces or diminishes the influence of currents (noise) flowing in the direction opposite to the transmitted signals. Most diodes, in principle, exhibit reverse current leakage. Therefore, diodes, such as Schottky diodes, will permit some reverse current (noise) to pass through. However, if the noise is sufficiently attenuated, the signal integrity of the signal moving in the opposite direction is not critically affected (i.e. the receiver of the signal can still accurately discern whether the signal is H level (high) or L level (low)). Therefore, it is not necessary to entirely block the noise current flowing in the reverse direction to the signal; it is only necessary to sufficiently attenuate the noise current so that it does not unduly influence/affect the signal integrity. Therefore, a variety of types of reverse (noise) current protection circuit that achieve or realize this noise reducing effect/function or even a noise eliminating effect/function may be suitably utilized with the present teachings.

(5-6) The present teachings may be applied to a variety of electric work machines, such as, for example: power tools for masonry, metalworking, and carpentry; work machines for gardening (e.g., outdoor power equipment); apparatuses prepared for work site environments; all of which are used at work sites such as professional or DIY carpentry, manufacturing, gardening, and construction. More specifically, the present teachings may be applied to a variety of electric work machines such as, for example, power hammers, power hammer drills, power drills, power drivers, power wrenches, power grinders, power circular saws, power reciprocating saws, power jigsaws, power cutters, power chainsaws, power planers, power nailers (including rivet tools), power hedge trimmers, power lawnmowers, power lawn clippers, power brush cutters, power cleaners, power blowers, power sprayers, power spreaders, power dust collectors or the like.

(5-7) A plurality of functions having a single constituent element in the embodiments above may be implemented by a plurality of constituent elements, and a single function having a single constituent element may be implemented by a plurality of constituent elements. In addition, a plurality of functions having a plurality of constituent elements may be implemented by a single constituent element, and a single function implemented by a plurality of constituent elements may be implemented by a single constituent element. In addition, a portion of the configuration of each embodiment above may be omitted. In addition, at least a portion of the configuration of each embodiment above may be supplemented or substituted by the configuration of other embodiments above.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery-connected (battery-powered) systems, electric work machines (e.g., power tools, outdoor power equipment, etc.), battery packs and chargers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Additional embodiments of the present teachings include, but are not limited to:

An electric work machine configured to receive electric power from a battery pack comprising a battery, the electric work machine comprising:
  a first positive electrode terminal configured to be electrically connected to a second positive electrode terminal of the battery pack;
  a first negative electrode terminal configured to be electrically connected to a second negative electrode terminal of the battery pack;
  a first communication terminal configured to be electrically connected to a second communication terminal of the battery pack;
  a data output circuit comprising an output terminal connected to the first communication terminal, the data output circuit being configured to generate and output a first signal via the output terminal;
  a data input circuit comprising an input terminal connected to the first communication terminal, and a ground terminal connected to the first negative electrode terminal, the data input circuit being configured to receive a second signal output from the second communication terminal of the battery pack via the first communication terminal and the input terminal;

a limiting circuit configured to at least limit a flow of electric current in a direction from the first negative electrode terminal to the first communication terminal via the data input circuit;

a manipulatable switch configured to be manipulated by a user of the electric work machine;

a motor;

a motor drive circuit configured to drive the motor, using electric power supplied from the battery pack via the first positive electrode terminal and the first negative electrode terminal, in accordance with manipulation of the manipulatable switch; and a drive mechanism configured to mount or hold a work output member and configured to cause the work output member to act on a work target by transmitting a rotational drive force of the motor and driving the work output member using that rotational drive force.

A charger configured to charge a battery pack comprising a battery, the charger comprising:

a first positive electrode terminal configured to be electrically connected to a second positive electrode terminal of the battery pack;

a first negative electrode terminal configured to be electrically connected to a second negative electrode terminal of the battery pack;

a first communication terminal configured to be electrically connected to a second communication terminal of the battery pack;

a data output circuit comprising an output terminal connected to the first communication terminal, the data output circuit being configured to generate and output a first signal via the output terminal;

a data input circuit comprising an input terminal connected to the first communication terminal, and a ground terminal connected to the first negative electrode terminal, the data input circuit being configured to receive a second signal from the second communication terminal of the battery pack via the first communication terminal and the input terminal;

a limiting circuit configured to at least limit a flow of electric current in a direction from the first negative electrode terminal to the first communication terminal via the data input circuit; and a charging circuit configured to output an electric current for charging the battery of the battery pack via the first positive electrode terminal and the first negative electrode terminal.

EXPLANATION OF THE REFERENCE NUMBERS 1, 3, 4, 5 Electric work machine system
2 Charging system
10, 71, 81 Battery pack
11, 31, 51 Positive electrode terminals
12, 32, 52 Negative electrode terminals
13, 33, 53 Communication terminals
14 Battery
15, 35, 55 Ground lines
23, 43, 63, 72, 77, 82, 87 Data input circuits
23a, 43a, 63a Input terminals
23b, 43b, 63b Ground terminals
24, 44, 64 Data output circuits
24a, 44a, 64a Output terminals
26, 46, 66 Signal paths
26a, 46a, 66a Connection points
30, 76, 86 Electric work machine
34 Motor
36 Manipulatable switch
37 Drive mechanism
38 Work output member
39, 59 Mounting part
45 Motor drive circuit
50 Charger
100 Intermediate device
101 First mounting part
102 Second mounting part
103 Cable
106 Positive electrode intermediate wire
107 Negative electrode intermediate wire
108 Communication intermediate wire
111 First positive electrode intermediate terminal
112 First negative electrode intermediate terminal
113 First communication intermediate terminal
121 Second positive electrode intermediate terminal
122 Second negative electrode intermediate terminal
123 Second communication intermediate terminal
D11, D31, D51, D72, D77, D82, D87 Diodes
T11, T31, T51 Switching devices

We claim:

1. A charger comprising:

a first positive electrode terminal configured to be electrically coupled to a second positive electrode terminal of a battery pack;

a first negative electrode terminal configured to be electrically coupled to a second negative electrode terminal of the battery pack;

a first communication terminal;

a charging circuit configured to supply electric power to the battery pack via the first positive electrode terminal and the first negative electrode terminal;

a data input circuit including an input terminal electrically coupled to the first communication terminal and a ground terminal electrically coupled to the first negative electrode terminal, the data input circuit being configured to receive first data via the first communication terminal and the input terminal, and a limiting circuit configured to limit a flow of electric current from the first negative electrode terminal to the first communication terminal via the data input circuit to a greater degree than a flow of electric current from the first communication terminal to the first negative electrode terminal via the data input circuit.

2. The charger according to claim 1, wherein the first communication terminal is configured (i) to be electrically coupled to a second communication terminal on the battery pack and (ii) to receive the first data from the battery pack via the second communication terminal.

3. The charger according to claim 1, further comprising a data output circuit including an output terminal electrically coupled to the first communication terminal, wherein the data output circuit is configured (i) to generate second data and (ii) to output the second data via the output terminal.

4. The charger according to claim 3, further comprising a signal path electrically coupling the first communication terminal and the input terminal, the signal path including a connection point, wherein:

the output terminal is electrically coupled to the connection point and thereby to the first communication terminal via the signal path; and the limiting circuit is electrically coupled to an electric current path extending from the connection point through the data input circuit to the first negative electrode terminal.

5. The charger according to claim 1, wherein:
the data input circuit includes:
  a switching device having a first switch terminal electrically coupled to the input terminal and a second switch terminal electrically coupled to the ground terminal;
  a bias path electrically coupling the first switch terminal and the second switch terminal; and
  a resistor in the bias path; and
the limiting circuit is in the bias path.

6. The charger according to claim 1,
wherein the limiting circuit includes a diode configured to limit the flow of the electric current from the first negative electrode terminal to the first communication terminal via the data input circuit.

7. The charger according to claim 3, wherein:
the input terminal is electrically coupled to the output terminal; and
the data input circuit is configured to receive the second data output by the data output circuit via the input terminal.

8. The charger according to claim 1,
wherein the limiting circuit has asymmetric conductance.

9. The charger according to claim 8,
wherein the limiting circuit is electrically coupled in series with an electric current path extending from the first communication terminal through the data input circuit to the first negative electrode terminal.

10. The charger according to claim 4,
wherein the limiting circuit is electrically coupled to the connection point and to the input terminal.

11. The charger according to claim 1, wherein:
the data input circuit includes:
  a switching device having a first switch terminal electrically coupled to the input terminal, and a second switch terminal electrically coupled to the ground terminal; and
  a signal path electrically coupling the second switch terminal to the ground terminal; and
the limiting circuit is in the signal path.

12. The charger according to claim 3, further comprising a communication circuit that (i) includes the data input circuit and the data output circuit, and (ii) is configured to perform half duplex serial communication with the battery pack via the first communication terminal.

13. A method comprising:
electrically coupling a first negative electrode terminal of a first electric device with a second negative electrode terminal of a second electric device, the first electric device being a charger, a battery pack, or an electric power tool, the second electric device being distinct from the first electric device; and limiting a flow of electric current from the first negative electrode terminal to a communication terminal of the first electric device via a data input circuit of the first electric device to a greater degree than a flow of electric current from the communication terminal to the first negative electrode terminal via the data input circuit.

14. The method according to claim 13,
wherein limiting a flow of electric current from the first negative electrode terminal to a communication terminal of the first electric device via a data input circuit of the first electric device to a greater degree than a flow of electric current from the communication terminal to the first negative electrode terminal via the data input circuit is performed based on:
  (i) the first negative electrode terminal being electrically coupled with the second negative electrode terminal; and/or
  (ii) an electric current flowing between the first negative electrode terminal and the second negative electrode terminal.

15. The charger according to claim 1, wherein:
the first positive electrode terminal is configured to be releasably coupled, physically and electrically, to the second positive electrode terminal of the battery pack; and/or
the first negative electrode terminal is configured to be releasably coupled, physically and electrically, to the second negative electrode terminal of the battery pack; and/or
the first communication terminal is configured to be releasably coupled, physically and electrically, to a second communication terminal of the battery pack.

16. The charger according to claim 1,
wherein the charging circuit is configured (i) to receive alternating electric current from outside the charger and (ii) to generate the electric power from the alternating electric current.

17. The charger according to claim 1, wherein:
the data input circuit further includes:
  a switching device including (i) a first switch terminal electrically coupled to the input terminal and (ii) a second switch terminal electrically coupled to the ground terminal; and
  a bias path electrically coupling the first switch terminal and the second switch terminal; and
the limiting circuit is configured to limit a flow of electric current from the first negative electrode terminal to the first communication terminal via the ground terminal, the bias path, and the input terminal to a greater degree than a flow of electric current from the first communication terminal to the first negative electrode terminal via the input terminal, the bias path, and the ground terminal.

* * * * *